United States Patent
Montojo et al.

(10) Patent No.: US 9,113,491 B2
(45) Date of Patent: Aug. 18, 2015

(54) UPLINK CONTROL AND DATA TRANSMISSION IN A MIXED SINGLE AND MULTIPLE CARRIER NETWORK

(75) Inventors: Juan Montojo, San Diego, CA (US); Peter Gaal, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 499 days.

(21) Appl. No.: 12/841,050

(22) Filed: Jul. 21, 2010

(65) Prior Publication Data

US 2011/0176498 A1     Jul. 21, 2011

Related U.S. Application Data

(60) Provisional application No. 61/227,681, filed on Jul. 22, 2009.

(51) Int. Cl.
*H04W 72/04* (2009.01)
*H04W 72/12* (2009.01)
(Continued)

(52) U.S. Cl.
CPC ........ *H04W 72/1242* (2013.01); *H04W 52/325* (2013.01); *H04W 72/048* (2013.01);
(Continued)

(58) Field of Classification Search
CPC .......... H04W 72/048; H04W 72/1242; H04W 72/1284; H04W 72/02; H04W 52/325; H04W 52/367; H04W 52/146; H04W 52/16; H04W 52/281; H04L 5/0044; H04L 5/0053
USPC ............. 370/329, 338, 252; 455/452.1–452.2
See application file for complete search history.

(56) References Cited

U.S. PATENT DOCUMENTS

| 6,157,616 | A  | 12/2000 | Whitehead |
| 6,173,162 | B1 | 1/2001  | Dahlman et al. |

(Continued)

FOREIGN PATENT DOCUMENTS

| EP | 1367739    | 12/2003 |
| EP | 1724948 A1 | 11/2006 |

(Continued)

OTHER PUBLICATIONS

3rd Generation Partnership Project; Technical Specification Group Radio Access Network; Further Advancements for E-UTRA Physical Layer Aspects(Release 9), 3GPP Draft; TR 36.814_130, 3rd Generation Partnership Project (3GPP), Mobile Competence Centre ; 650, Route Des Lucioles ; F-06921 Sophia-Antipolis Cedex ; France, no. Shenzhen, China; Aug. 24, 2009, Jun. 1, 2009, pp. 1-46, XP050388254, [retrieved on Aug. 28, 2009].

(Continued)

*Primary Examiner* — Pao Sinkantarakorn
*Assistant Examiner* — Richard Chang
(74) *Attorney, Agent, or Firm* — Liem T. Do

(57) ABSTRACT

Providing for mixed single carrier and multi-carrier uplink transmission in a wireless communication environment is described herein. By way of example, a network is provided that can identify uplink capabilities or restrictions of respective devices of a mixed population of mobile devices, and schedule single carrier or multi-carrier transmissions accordingly. In some aspects, different subsets of multi-carrier transmission can be given priority over other subsets. Based on the priority, the network can schedule/modify relative transmit powers for respective subsets, accommodate power constraints of higher level networking protocols, and optionally give priority to one or more of the distinct transmissions. In addition, priority can be given to respective subsets of the multi-carrier transmission, to ensure high quality or reliability for important transmissions. Thus, provided is an integrated network that accommodates a powerful mix of single carrier and multi-carrier services for a mixed population of mobile devices.

38 Claims, 14 Drawing Sheets

(51) Int. Cl.

| | |
|---|---|
| *H04W 52/32* | (2009.01) |
| *H04L 5/00* | (2006.01) |
| *H04W 52/14* | (2009.01) |
| *H04W 52/16* | (2009.01) |
| *H04W 52/28* | (2009.01) |
| *H04W 52/36* | (2009.01) |
| *H04W 72/02* | (2009.01) |

(52) U.S. Cl.
CPC ............ *H04L5/0044* (2013.01); *H04L 5/0053* (2013.01); *H04W 52/146* (2013.01); *H04W 52/16* (2013.01); *H04W 52/281* (2013.01); *H04W 52/367* (2013.01); *H04W 72/02* (2013.01); *H04W 72/1284* (2013.01)

(56) References Cited

U.S. PATENT DOCUMENTS

| | | | |
|---|---|---|---|
| 2005/0135312 A1 | 6/2005 | Montojo et al. | |
| 2006/0152285 A1 | 7/2006 | Gustavsson et al. | |
| 2007/0149229 A1 | 6/2007 | Frederiksen et al. | |
| 2009/0186613 A1* | 7/2009 | Ahn et al. ................. | 455/434 |
| 2009/0232194 A1 | 9/2009 | Yoshida | |
| 2010/0142455 A1* | 6/2010 | Imamura ................... | 370/329 |
| 2010/0165931 A1* | 7/2010 | Nimbalker et al. ......... | 370/329 |
| 2010/0232373 A1* | 9/2010 | Nory et al. ................ | 370/329 |
| 2012/0002568 A1* | 1/2012 | Tiirola et al. .............. | 370/252 |

FOREIGN PATENT DOCUMENTS

| | | |
|---|---|---|
| EP | 1793509 A1 | 6/2007 |
| EP | 2077692 A2 | 7/2009 |
| EP | 2184863 A1 | 5/2010 |
| WO | WO03081800 A1 | 10/2003 |
| WO | WO2007029406 A1 | 3/2007 |
| WO | WO2009015612 A1 | 2/2009 |
| WO | WO2009048404 | 4/2009 |
| WO | WO2009060324 A1 | 5/2009 |
| WO | 2009088166 A2 | 7/2009 |

OTHER PUBLICATIONS

Hongku Kang, et al., "OFDM systems with D52 subchannel power control under the two-ray multipath channel", ICC 2001, 2001 IEEE International Conference on Communications. Conference Record, Helsinky, Finland, Jun. 11, 2014, 2001; [IEEE International Conference on Communications], New York, NY: IEEE, US, vol. 6, Jun. 11, 2001, pp. 1856-1860, XP010553188, DOI: 10.1109/ICC.2001. 937112, ISBN: 978-0-7803-7097-5.

International Search Report and Written Opinion—PCT/US2010/042963—ISA/EPO—Oct. 11, 2011.

LG Electronics: "UCI transmission in case of transmit power limitation", 3GPP Draft; R1-092502 LTEAJJCI Piggybacking on Pusch, 3rd Generation Partnership Project (3GPP), Mobile Competence Centre; 650, Route Des Lucioles ; F-06921 Sophia-Antipolis Cedex; France, no. Los Angeles, USA; Jun. 23, 2009, pp. 1-4, XP050351009, [retrieved on Jun. 23, 2009].

LG Electronics: "Uplink transmission under UE transmit power limitation", 3GPP Draft; R1-092503 LTEAJJL TXP Limitation, 3rd Generation Partnership Project (3GPP), Mobile Competence Centre 650, Route Des Lucioles; F-06921 Sophia-Antipolis Cedex; France, no. Los Angeles, USA; Jun. 23, 2009, pp. 1-3, XP050351010, [retrieved on Jun. 23, 2009].

3rd Generation Partnership Project, Technical Specification Group Radio Access Network, Further Advancements for E-UTRA Physical Layer Aspects (Release 9 ), 3GPP Standard, 3GPP TR 36.814, 3rd Generation Partnership Project (3GPP), Mobile Competence Centre , 650, Route Des Lucioles , F-06921 Sophia-Antipolis Cedex , France, no. V0.4.1, Feb. 1, 2009, pp. 1-31, XP050380817.

Taiwan Search Report—TW099124215—TIPO—Aug. 14, 2013.

* cited by examiner

UPLINK CONTROL AND DATA TRANSMISSION IN A MIXED SINGLE AND MULTIPLE CARRIER NETWORK

CLAIM OF PRIORITY UNDER 35 U.S.C §119

The present application for patent claims priority to Provisional Patent Application Ser. No. 61/227,681 entitled "UPLINK CONTROL AND DATA TRANSMISSION IN A MIXED SINGLE AND MULTIPLE CARRIER NETWORK" and filed Jul. 22, 2009, assigned to the assignee hereof and hereby expressly incorporated by reference herein.

BACKGROUND

I. Field

The following description relates generally to wireless communications, and more particularly to facilitating arbitration of quality of service association for wireless streams employing user deployed, broadband-based wireless access points.

II. Background

Wireless communication systems are widely deployed to provide various types of communication content, such as voice content, data content, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink—DL) refers to the communication link from base stations to mobile devices, and the reverse link (or uplink—UL) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

One example multiple access system that supports MIMO technology is the $3^{rd}$ generation partnership project (3GPP) long term evolution (LTE) wireless system (also referred to as LTE). The LTE system represents a major advance in cellular technology and is an evolution in cellular 3G services of global system for mobile communications (GSM) and universal mobile telecommunications system (UMTS). LTE provides an uplink speed of up to 75 megabits per second (Mbps) and a downlink speed of up to 300 Mbps. With these high data rates, LTE can offer similar or greater speeds than traditional wired networking, such as digital subscriber line (DSL) or cable modem systems, and serve as an effective replacement of traditional wired Internet services.

In addition to the foregoing, LTE brings other technical benefits to cellular networks. LTE is designed to meet carrier needs for high speed data and media transport as well as high capacity voice support. Bandwidth is scalable from 1.4 MHz to 20 MHz. This scalable bandwidth provides a flexible system for network operators that have different bandwidth allocations for their subscribers, and also allows operators to provide different spectrum-based services. LTE is also expected to improve spectral efficiency with respect to 3G networks, allowing carriers to provide more data and voice services over a given bandwidth. LTE encompasses high-speed data, multimedia unicast and multimedia broadcast services.

The LTE physical layer (PHY) is an efficient means of conveying both data and control information between an enhanced base station (eNodeB) and mobile user equipment (UE). The LTE PHY employs some advanced technologies that are relatively new to cellular applications. For instance, the LTE PHY employs orthogonal frequency division multiplexing (OFDM) and MIMO data transmission. On a downlink, LTE PHY employs orthogonal FDMA (OFDMA), and single carrier FDMA (SC-FDMA) on an uplink. OFDMA enables data to be directed to or from multiple users on a subcarrier-by-subcarrier basis for a specified number of symbol periods. Furthermore, SC-FDMA transmissions typically incur low peak to average power ratio (PAPR) and hence facilitate efficient power amplifier utilization for a user equipment (a UE).

Just as LTE is an advancement over previous systems, however, current developments in wireless communication involve standards that exceed current specifications of LTE. For instance, the evolution of LTE denoted as LTE-Advanced calls for 1 Gbit/s data rates in the DL, as well as the possibility to aggregate multiple LTE component carriers, and improved UL performance. As wireless networks and infrastructure change in capabilities, so too do mobile terminals. Thus, newer terminals configured for LTE-Advanced systems accommodate greater data rates through single-user MIMO (SU-MIMO), and other features. At the same time, older terminals that do not accommodate these features are to co-exist with the newer terminals in the same spectrum. Accordingly, one design problem for existing and future wireless networks is to accommodate a mixed population of mobile terminals having different and diverse capabilities. Existing networks, therefore, might be adapted to accommodate at least some features being planned for future networks, which might be incorporated into available mobile terminals even before release of such networks. Likewise, newer networks are generally designed to be backward compatible, providing one set of features for legacy mobile terminals, and different or additional features for advanced mobile terminals.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the subject disclosure in a simplified form as a prelude to the more detailed description that is presented later.

The subject disclosure provides for LTE-Advanced mobile devices that enable relaxation of single carrier uplink (UL) transmission requirements of LTE, while reusing LTE physical layer channels to avoid bandwidth loss incurred in regular LTE operation (e.g., when control and data information are transmitted in a single subframe). This further enables transmission of control information in a common set of physical wireless resources irrespective of whether data transmission occurs in a given subframe.

With these objectives in mind, aspects of the subject disclosure provide a mobile terminal operable in an LTE wireless network, and configured for single-carrier or multi-carrier uplink operation. As an example, the mobile terminal can be configured to transmit control information and data information in a single LTE subframe. For instance, in any given subframe the mobile terminal can schedule and transmit both a physical uplink control channel (PUCCH) message comprising the control information, and a physical uplink shared channel (PUSCH) message comprising the data information. In at least one aspect, the mobile terminal can select different transmit powers for the PUCCH message and the PUSCH message. Thus, as a particular example, in the event that the mobile terminal operates under a transmission power constraint, transmit power for the PUSCH message can be reduced to meet the power constraint while mitigating or avoiding impact of the transmit power constraint for the PUCCH message.

Additional aspects of the subject disclosure provide for wireless networking that facilitates uplink service for a mixed population of LTE mobile devices capable of single carrier transmissions only and LTE-A mobile devices capable of non-single carrier transmissions (e.g., multi-carrier transmissions). In some aspects of the subject disclosure, a frequency division multiple access (FDMA) network is provided that can identify uplink capabilities or restrictions of respective devices of the mixed population, and schedule single carrier or multi-carrier transmissions accordingly. Furthermore, the FDMA network can provide a transmit power schedule for multi-carrier devices, specifying different transmit powers for distinct transmissions. According to particular aspects, the network can accommodate power constraints of higher level networking protocols, and optionally give priority to one or more of the distinct transmissions. In addition, the transmit power schedule can reflect a transmit power constraint and transmission priority(ies), to ensure high quality or reliability for important transmissions. Thus, provided is an integrated FDMA network that accommodates a powerful mix of LTE and LTE-Advanced features to provide seamless services for a mixed population of mobile devices.

In other aspects of the subject disclosure, provided is a mobile terminal configured for multi-carrier FDMA transmission. The mobile terminal is configured to transmit at different power for different types of concurrent transmissions. As one particular example, the mobile terminal can transmit control information at one transmit power, and data information at a second transmit power. In at least one aspect, provided is a mobile terminal configured for selective single carrier or multi-carrier transmission. This mobile terminal can dynamically select between single carrier and multi-carrier operation at least for uplink communication to accommodate various constraints imposed by a serving network. For instance, where the serving network supports single carrier only, the mobile terminal can select single carrier transmission; likewise, where the serving network supports multi-carrier transmission, the mobile terminal can select single carrier or multi-carrier transmission. According to a particular aspect, the mobile terminal can select among single carrier or multi-carrier based at least in part on temporary constraints imposed by the serving network, such as uplink transmit power.

In one set of aspects, disclosed is a method of wireless communication involving a frequency division multiple access uplink. The method can comprise generating an uplink (an UL) transmission schedule for a population of mobile devices that includes an assignment of UL resources to a first subset of the population of mobile devices based on a single-carrier constraint, and a second assignment of UL resources to a second subset of the population of mobile devices without the single-carrier constraint. Further, the method can comprise transmitting the UL transmission schedule on a downlink (a DL) to the population of mobile devices.

In still other aspects, provided is an apparatus configured for frequency division multiple access uplink wireless communication (FDMA UL wireless communication). The apparatus can comprise a communication interface for sending and receiving wireless signals within a geographic coverage area, and memory for storing instructions configured to provide selective single-carrier and multi-carrier transmission for the FDMA UL wireless communication. Further, the apparatus can comprise a data processor for executing modules that implement the instructions. More particularly, the modules can comprise a parsing module that identifies a first subset of the mobile devices limited to single carrier UL transmission and a second subset of the mobile devices configured at least for multi-carrier UL transmission. Further to the above, the modules can also comprise a scheduling module that assigns UL resources for the set of mobile devices based on single carrier and multi-carrier transmit capabilities of the first subset of the mobile devices and the second subset of the mobile devices, respectively.

In still other aspects of the subject disclosure, provided is an apparatus configured for wireless communication involving a FDMA uplink. The apparatus can comprise means for generating an uplink (an UL) transmission schedule for a population of mobile devices that assigns UL resources to a first subset of the population of mobile devices based on a single-carrier constraint, and assigns additional UL resources to a second subset of the population of mobile devices without the single-carrier constraint. Further, the apparatus can comprise means for transmitting the UL transmission schedule on a downlink to the population of mobile devices.

In one or more other aspects, disclosed is at least one processor configured for wireless communication in a FDMA uplink system. The processor(s) can comprise a module that generates an uplink (an UL) transmission schedule for a population of mobile devices, wherein the processor assigns UL resources to a first subset of the population of mobile devices based on a single-carrier constraint, and further wherein the processor assigns UL resources to a second subset of the population of mobile devices without the single-carrier constraint. The processor(s) can further comprise a module that transmits the UL transmission schedule on a downlink to the population of mobile devices.

In an additional aspect, the subject disclosure provides a computer program product comprising a computer-readable medium. Specifically, the computer-readable medium can comprise code for causing a computer to generate an uplink (an UL) transmission schedule for a population of mobile devices, wherein the processor assigns UL resources to a first subset of the population of mobile devices based on a single-carrier constraint, and further wherein the processor assigns UL resources to a second subset of the population of mobile devices without the single-carrier constraint. Moreover, the computer-readable medium can also comprise code for causing the computer to transmit the UL transmission schedule on a downlink to the population of mobile devices.

Further to the above, provided is a method of wireless communication employing a FDMA UL. The method can comprise obtaining a power schedule for transmission of UL traffic on the FDMA UL. Moreover, the method can comprise generating a transmission schedule for respective subsets of the UL traffic according to a traffic priority assigned to one subset of the UL traffic that is specified in the power schedule. In addition to the foregoing, the method can also comprise transmitting the multi-carrier traffic according to the transmission schedule.

According to additional aspects, disclosed is an apparatus configured for wireless communication with a third generation partnership project long term evolution wireless network (an LTE network). The apparatus can comprise a communication interface that employs a wireless transceiver for sending wireless information to the LTE network on an uplink and receiving wireless information from the LTE network on a downlink. Further, the apparatus can comprise memory for storing instructions related to facilitating multi-carrier uplink transmission with the LTE network and a data processor for executing modules that implement the multi-carrier uplink transmission. These modules can comprise an arbitration module that selects between single carrier and multi-carrier uplink transmission for the apparatus, and a scheduling module that identifies a set of control information and a set of data information for uplink transmission by the wireless transceiver, and that assigns the set of control information and the set of data information to either one subframe, or to multiple subframes, depending on a selection made by the arbitration module.

In still other aspects, disclosed is an apparatus for wireless communication that employs a FDMA uplink. The apparatus can comprise means for obtaining an uplink power constraint from a wireless network. Moreover, the apparatus can comprise selecting between single carrier and multi-carrier uplink transmission based at least in part on the uplink power constraint. Furthermore, the apparatus can also comprise identifying a set of control information and a set of data information for uplink transmission by the apparatus and to assign the set of control information and the set of data information to either one subframe for a multi-carrier selection, or to multiple subframes for a single carrier selection.

In one or more additional aspects, provided is at least one processor configured for wireless communication utilizing a FDMA uplink. The processor(s) can comprise a module that obtains an uplink power constraint from an FDMA network and a module that selects between single carrier and multi-carrier uplink transmission based at least in part on the uplink power constraint. Moreover, the processor(s) can comprise a module that identifies a set of control information and a set of data information for uplink transmission and that assigns the set of control information and the set of data information to either one subframe for a multi-carrier selection, or to multiple subframes for a single carrier selection.

In at least one aspect, the subject disclosure provides for a computer program product comprising a computer-readable medium. More particularly, the computer-readable medium can comprise code for causing a computer to obtain an uplink power constraint from an FDMA network and code for causing the computer to select between single carrier and multi-carrier uplink transmission based at least in part on the uplink power constraint. Furthermore, the computer-readable medium can comprise code for causing the computer to identify a set of control information and a set of data information for uplink transmission and to assign the set of control information and the set of data information to either one subframe for a multi-carrier selection, or to multiple subframes for a single carrier selection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
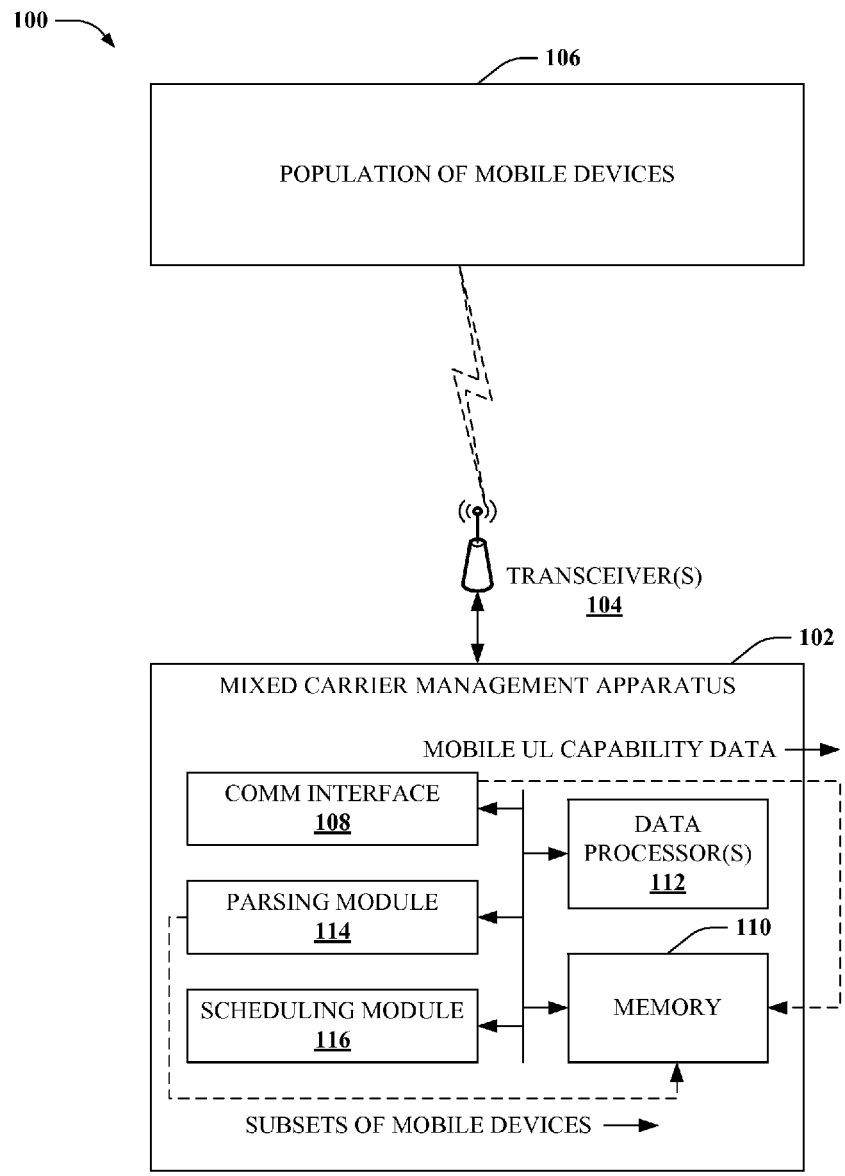
FIG. 1 illustrates a block diagram of an example wireless system utilizing mixed single and multi-carrier uplink according to aspects of the subject disclosure.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing support for mixed populations of single and multi-carrier mobile terminals in a wireless communication network. One skilled in the art should appreciate that similar techniques could apply to other communication environments.

Wireless communication systems achieve electronic communication between remotely located wireless nodes through local infrastructure deployments and central networks that communicatively couple local infrastructure (e.g., a base station). In general, the local infrastructure can utilize various principles to exchange wireless information with these nodes. But each case depends on establishing a wireless link between a transmitter of the wireless node and a receiver of the local infrastructure or base station, and vice versa. Typically, each transmitter-receiver pair employing a distinct wireless link forms a distinct spatial channel, also referred to as a wireless channel, or signal dimension. Individual wireless links utilize distinct sets of orthogonal wireless resources (e.g., frequency subband, time subslot, code-spread factor, and so on), employed by the wireless node and local infrastructure. By transmitting or decoding signals only on the set of orthogonal wireless resources, data transmitted on one wireless link (set of resources employed by a transmitter-receiver pair) can be distinguished from data transmitted on other wireless links (sets of resources employed by other transmitter-receiver pairs). This is one characteristic employed by multiple access systems, such as a frequency division multiple access network (a FDMA network), to enable multiple wireless links to exist concurrently in a single geographic region.

As wireless communication evolves and new technologies arise, wireless service providers often attempt to adapt existing wireless infrastructure to support new features, where possible. In addition, new network deployments can be made backward compatible, so to speak, to serve legacy wireless terminals configured for older wireless technologies. As an example, 3$^{rd}$ generation partnership project (3GPP) long term evolution (LTE) networks (also referred to herein as LTE networks) are third generation (3G) networks that utilize orthogonal frequency division multiplex (OFDM) technology on a downlink (DL), and single carrier FDMA (SC-FDMA) technology on an uplink (UL). However, proposals for fourth generation (4G) advancements to LTE networks incorporate full multi-carrier OFDM for the UL. Single carrier and multi-carrier UL technologies can often be mutually exclusive, however, depending on a manner in which they are implemented. Accordingly, new adaptations to bridge the gap between single carrier LTE and multi-carrier 4G networks would be beneficial. Particularly, a wireless network that can accommodate a mixed population of single carrier and multi-carrier wireless terminals could satisfy one potential concern regarding upcoming release of 4G wireless terminals.

In addition to the foregoing, some network operators may choose not to update existing 3G infrastructure to accommodate multi-carrier terminals. Likewise, it is conceivable that some 4G networks may not be fully compatible with 3G wireless terminals, for at least some duration of their deployment. Accordingly, a mobile device that can select between single and multi-carrier UL transmission can traverse both these networks, and solve this potential problem. Accordingly, particular aspects of the subject disclosure provide a mobile terminal configured to transmit both control information (e.g., physical uplink control channel [PUCCH] signals) and data information (e.g., physical uplink shared channel [PUSCH] signals) concurrently. Such a mobile terminal operating in an LTE environment would break single carrier frequency division multiple access (SC-FDMA) constraints. Accordingly, in other aspects of the subject disclosure, provided are network solutions for multi-carrier uplink operation in a FDMA environment. In additional aspects, provided is a wireless network capable of supporting mixed populations of single carrier and multi-carrier UL wireless devices, as well as mobile terminals that can operate as multi-carrier UL devices, and other mobile terminals that can select between single carrier and multi-carrier UL transmission.

Turning now to the figures, FIG. 1 illustrates a block diagram of an example wireless communication arrangement 100 according to aspects of the subject disclosure. The wireless communication arrangement 100 comprises a mixed carrier management apparatus 102 that provides wireless services for a mixed population of mobile devices 106 (e.g., cellular phone, smartphone, mobile terminal, wireless terminal, and so on). Particularly, mixed carrier management apparatus 102 can provide single carrier and multi-carrier UL services for mobile devices 106. When coupled with wireless network infrastructure (e.g., one or more wireless transceivers 104, coupled to a network base station for instance), mixed carrier management apparatus 102 can enable a single base station to support both single carrier UL devices, as well as multi-carrier UL devices.

Mixed carrier management apparatus 102 can comprise a communication interface 108 for sending and receiving wireless signals within a geographic coverage area served by wireless transceiver(s) 106. Communication interface 108 can employ wireless transceiver(s) 106 to transmit information to mobile devices 106 on a DL, and receive information from mobile devices 106 on an UL. The DL can comprise a multi-carrier technology, such as OFDM, or can comprise a single carrier technology, such as single carrier frequency domain equalization (SC-FDE), SC-FDMA, or a combination thereof. The UL comprises a single carrier technology and a multi-carrier technology, as is described in more detail below.

In addition to the foregoing, mixed carrier management apparatus 102 can comprise memory 110 for storing instructions configured to provide selective single-carrier and multi-carrier transmission for UL wireless communication, and a data processor 112 for executing modules that implement the instructions. Particularly, data processor 112 executes a parsing module 114 that identifies different subsets of mobile devices 106 having different UL transmit capabilities. As one example, parsing module 114 identifies a first subset of the mobile devices 106 limited to single carrier UL transmission and a second subset of the mobile devices 106 configured at least for multi-carrier UL transmission. The first subset could comprise, for instance, mobile devices configured for the LTE Release 8 standard, whereas the second subset could be mobile devices configured for LTE Release 10 (e.g., LTE advanced, or LTE-A), or another suitable future LTE release requiring multi-carrier UL. The different subsets of mobile devices, as well as their respective UL transmit capabilities, can be stored by parsing module 114 in memory 110.

In addition to the foregoing, data processor 112 can execute a scheduling module 116 that assigns UL resources for the set of mobile devices based on single carrier and multi-carrier transmit capabilities respective subsets of the mobile devices. Thus, as a particular example, if the first subset of the mobile devices comprise single-carrier devices, scheduling module 116 can assign a contiguous block of resources for either a set of control information, or a set of data information, in any given transmission time slot (e.g., a subframe, subslot, and so on). Additionally, scheduling module 116 can assign the second subset of the mobile devices to transmit a set of control information and a set of data information in one or more different resource blocks in a single transmission time slot. In the latter case, the set of data information and set of control information can be each in separate contiguous resource blocks, although scheduling module 116 is not limited to this implementation. Rather, two or more non-contiguous resource blocks can be employed for the set of data information or the set of control information, or both, as suitable.

In one possible implementation of the foregoing, parsing module 114 obtains the UL transmit capabilities of the first subset of the mobile devices and UL transmit capabilities of the second subset of the mobile device. Scheduling module 116 then generates an UL resource schedule for the set of mobile devices 106. Particularly, the UL resource schedule specifies UL resources for the first set of mobile devices based on respective UL transmit capabilities that constrains the first subset of the mobile devices to single carrier UL transmission. Additionally, the UL resource schedule can specify UL resources for the second set of mobile devices that facilitates single carrier or multi-carrier UL transmission for the second subset of the mobile devices. In this manner mixed carrier management apparatus 102 can control single carrier or multi-carrier UL transmission behavior of respective devices of mobile devices 106.

In some aspects of the subject disclosure, mixed carrier management apparatus 102 can provide transmit power assignments for the subsets of mobile devices 106 in addition to the resource scheduling. Further, it should be appreciated that transmit power assignments can be per device, and can take into consideration the UL transmission capabilities of respective devices provided by parsing module 114. For single carrier the assignments are generally straightforward, with a single transmit power per transmission time slot. For multi-carrier, different transmit powers can be specified for different sets of information, as described in more detail herein (e.g., see FIG. 3, infra). Further, the transmit power can be calculated to satisfy one or more power constraints (e.g., to reduce interference with neighboring cells, lower overall cell noise, and so on) imposed by a wireless network.

Figure 2:
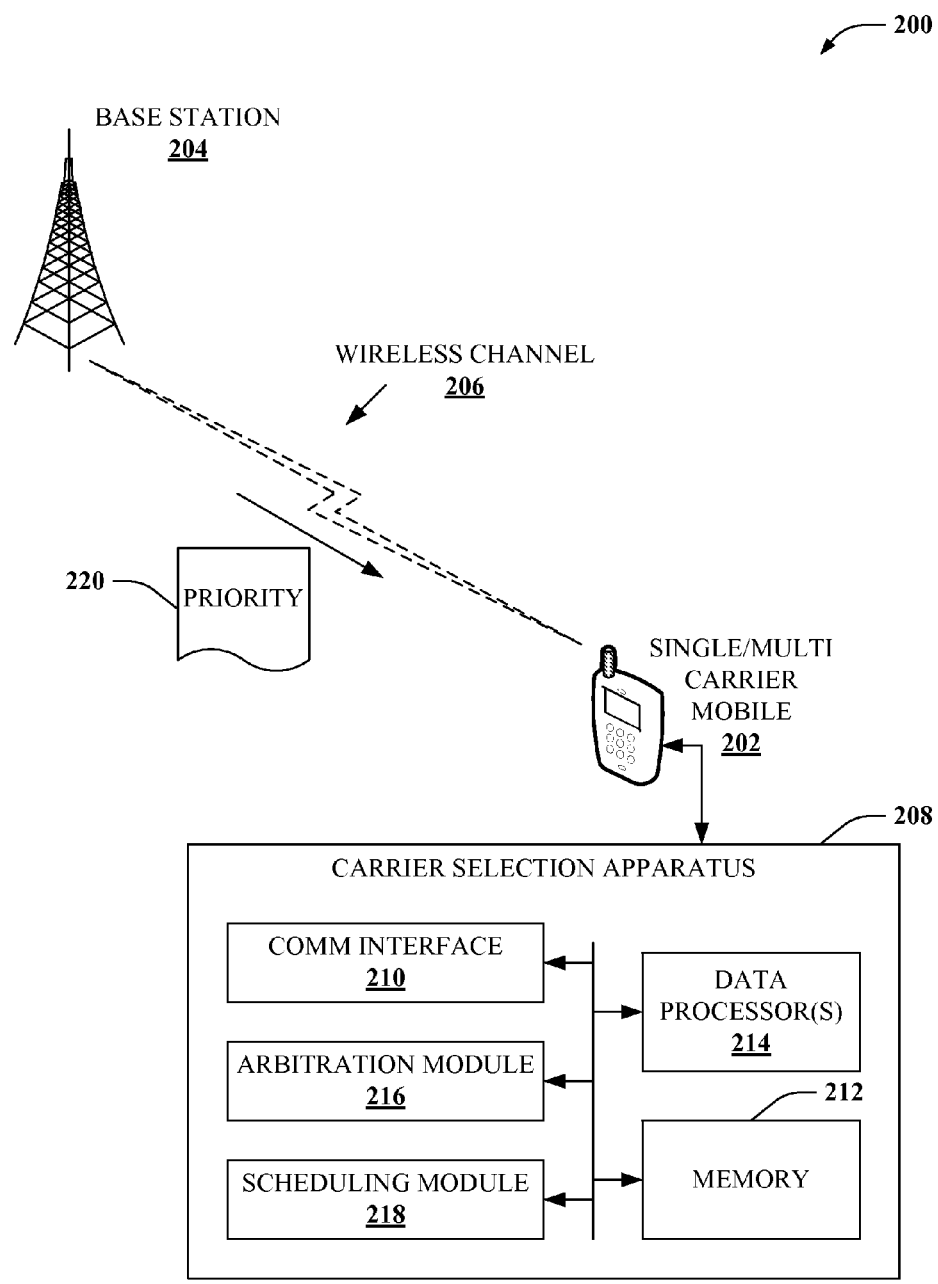
FIG. 2 depicts a block diagram of an example wireless communication involving selective single or multi-carrier uplink communication in some aspects.

FIG. 2 illustrates a block diagram of an example wireless communication system 200 according to further aspects of the subject disclosure. Wireless communication system 200 comprises a base station 204 communicatively coupled with a single/multi carrier mobile device 202 via a wireless channel 206. Single/multi carrier mobile device 202 can be configured to select between single carrier UL transmission and multi-carrier UL transmission. Particularly, single/multi carrier mobile device 202 can comprise a carrier selection apparatus 208 configured to perform this selection. Selection between type of UL carrier can be based on one or more conditions loaded in memory 212 of carrier selection apparatus 208. Alternatively, or in addition, selection between type of UL carrier can be based at least in part on a command or condition transmitted by base station 204. In at least one aspect, the condition can comprise a power constraint relative to a target transmit power, or minimum transmit power of one or more sets of UL data. In other aspects, the condition can comprise a transmission priority 220 specified for one or more types or streams of traffic, as discussed below.

Carrier selection apparatus 208 can comprise a communication interface 210 that employs a wireless transceiver (not depicted, but see FIG. 5, infra) of single/multi carrier mobile device 202 for sending wireless information to base station 204 on an UL and receiving wireless information from base station 204 on a DL. It should be appreciated that base station 204 can be part of various types of wireless networks. In one aspect, base station 204 can be part of a network that supports single carrier UL transmission, such as an LTE network. In another aspect, base station 204 can be part of a network that supports multi-carrier UL transmission, such as an LTE-A network, a worldwide interoperability for microwave access (WiMAX) network, or the like. In other aspects, base station 204 can be part of a network that supports both single carrier and multi-carrier UL transmission (e.g., see FIG. 1, supra).

In addition to the foregoing, carrier selection apparatus 208 can comprise memory 212 for storing instructions related to facilitating multi-carrier UL transmission and a data processor 214 for executing modules that implement the multi-carrier UL transmission. Particularly, data processor 214 can execute an arbitration module 216 that selects between single carrier and multi-carrier UL transmissions for single/multi carrier mobile device 202. Selection can be based on the type of UL transmission supported by base station 204, as one example. In another example, arbitration module 216 selects between single carrier and multi-carrier based at least in part on an UL transmit power constraint established by base station 204. For instance, where a target multi-carrier transmit power exceeds the power constraint, arbitration module 216 can select single carrier transmission, enabling single/multi carrier mobile 202 to utilize up to the permitted transmit power for each single carrier transmission (see, e.g., FIG. 3, infra, for additional examples). As yet another example, arbitration module 216 selects between single carrier and multi-carrier based at least in part on a command from base station 204.

In at least one aspect, selection can be based at least in part on a transmission priority 220 specified by base station 204. This transmission priority 220 can, for instance, specify a particular type of UL transmission that receives priority over other transmissions. As an example, transmission priority 220 can specify that data traffic (e.g., voice calls, media traffic, voice over Internet Protocol [VoIP] traffic, and so on) receivers priority over control traffic (e.g., acknowledgment [ACK] or negative ACK [NACK], channel quality information [CQI], a precoding matrix indicator [PMI], and so on), or vice versa. Priority traffic can be allocated a higher transmit power than non-priority traffic or a lower priority traffic (e.g., where a power constraint is specified), or can be transmitted in an earlier subframe, for single carrier operation, or the like.

In other aspects, transmission priority can be given to subsets of data traffic or subsets of control traffic. Subsets of data traffic can be delineated by type of traffic, such as voice traffic, browsing traffic, streaming media traffic (e.g., streaming audio, streaming video, or the like), and so on, delineated by quality indicator, such as quality of service (QoS) traffic or non-QoS traffic, or delineated by different traffic streams (e.g., one stream for a voice call and a second stream for a streaming audio application), or the like, or a suitable combination thereof. As one illustrative example, VoIP or circuit-switched voice traffic can be given priority over web browsing traffic. Subsets of control traffic can include call setup or termination traffic, pilot signal transmission, an access request, ACK/NACK traffic, CQI traffic, PMI traffic, automatic repeat request (ARQ) traffic, hybrid ARQ (HARQ) traffic, and so on. As one example in the context of subsets of control traffic, transmission priority 220 can specify priority for missed UL control transmission (e.g., a missed HARQ transmission) over other UL control transmissions, and over data transmissions. Priority for subsets of control or data traffic can be treated as mentioned above, with respective to other traffic types (e.g., control traffic, data traffic) or other traffic subsets. It should be appreciated that the subject disclosure is not limited to the foregoing examples, however (or to other specific examples or instances provided elsewhere in the disclosure). Rather, other suitable examples that would be understood by one of skill in the art, through prior experience in the art or by way of the context provided herein, are considered within the scope of the subject disclosure.

Further to the above, carrier selection apparatus 208 can comprise a scheduling module 218 that identifies a set of control information and a set of data information for UL transmission by a wireless transceiver of mobile device 202. Additionally, scheduling module 218 assigns the set of control information and the set of data information to either one transmission time slot, or to multiple transmission time slots, depending on a single carrier or multi-carrier UL selection made by arbitration module 214. More particularly, for multi-carrier UL transmission, scheduling module 218 can be configured as a module that assigns the set of control information and the set of data information to an entire spectrum bandwidth of the UL subframe or subslot that is allocated to control and data traffic. This provides full spectrum utilization, which generally cannot be accomplished with SC-FDMA systems such as LTE Release 8, without breaking single carrier constraints. In one particular implementation, arbitration module 216 selects single carrier if a transmit power constraint disallows a target control transmit power or a minimum data transmit power utilized for multi-carrier UL transmission. In this case, scheduling module 218 gives transmission priority to the set of control information over the set of data information (e.g., if the data traffic is best effort QoS traffic), or can alternatively give transmission priority to the set of data information over the set of control information (e.g., if the data traffic is elevated QoS traffic). According to this implementation, carrier selection apparatus 208 can provide flexible implementation of single carrier or multi-carrier UL transmission to provide reliable QoS, throughput, reliability, mitigated packet loss, or the like, where a constraint on multi-carrier transmission could negatively affect traffic quality or reliability.

Figure 3:
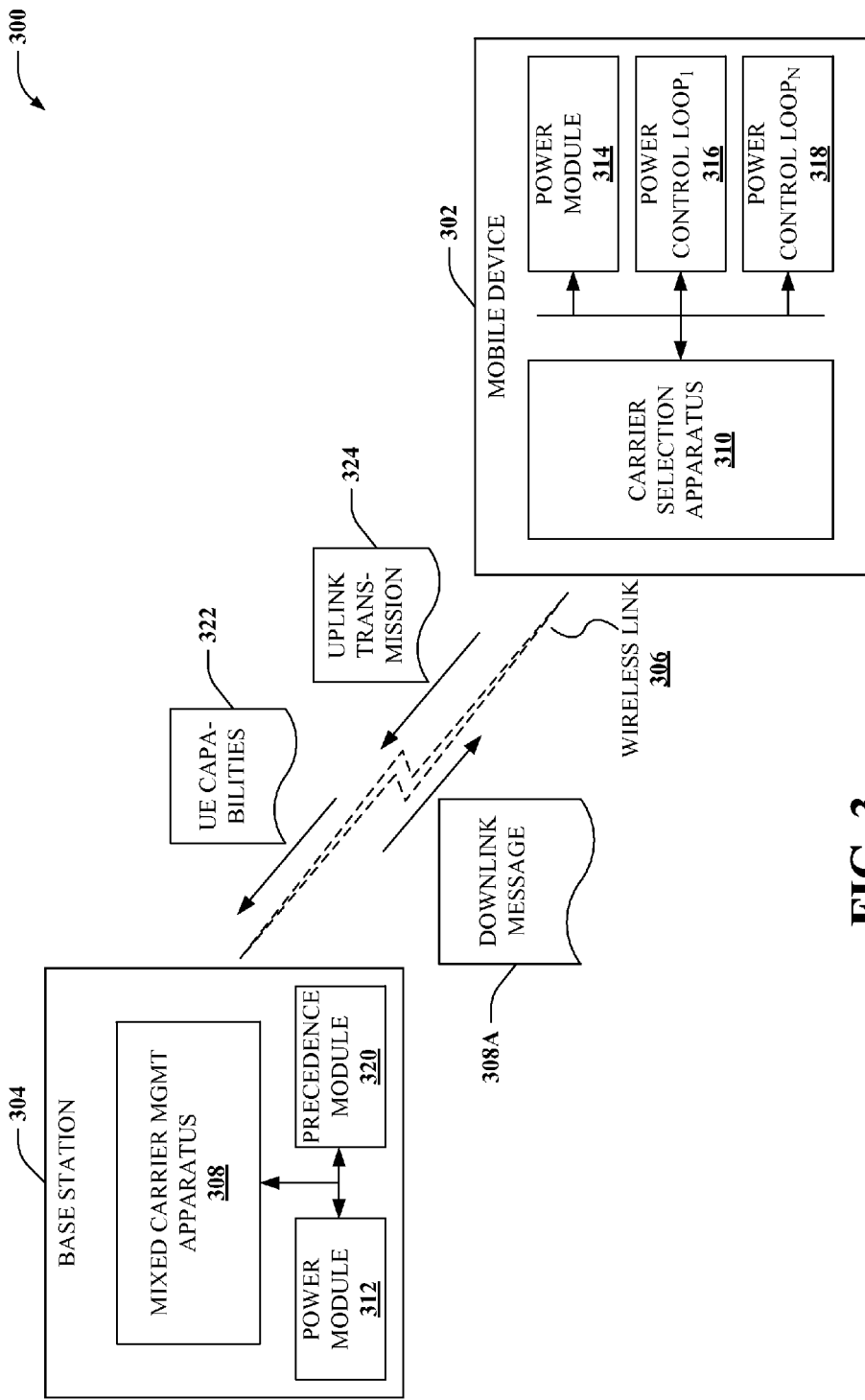
FIG. 3 illustrates a block diagram of a sample wireless communication suitable for a mixed population of single and multi-carrier mobile devices.

FIG. 3 illustrates a block diagram of an example wireless communication environment 300 according to aspects of the subject disclosure. Wireless communication environment 300 comprises a base station 304 communicatively coupled with a mobile device 302 via a FDMA wireless link 306. Base station 304 transmits information to mobile device 302 on an FDMA DL, and mobile device 302 transmits information to base station 304 on an FDMA UL. In some aspects of the subject disclosure, mobile device 302 can employ the FDMA UL in a multi-carrier fashion. In other aspects, mobile device 302 can employ the FDMA UL in a single-carrier fashion. In still other aspects, mobile device 302 can select between single carrier and multi-carrier transmission on the FDMA UL, based on prevailing wireless conditions, commands sent by base station 304, transmission constraint imposed by base station 304, traffic priority, or the like, or a suitable combination thereof. In some cases, selection between single carrier and multi-carrier can be on a subframe by subframe basis. This could occur, for instance, where suitable processing speed and power is available to perform the determination in each subframe. Where battery power is low, or where complexity of the determination is high, frequency of selection can be performed for some but not all subframes, or on longer time intervals, such as every time frame, and so on.

Base station 304 can comprise a mixed carrier management apparatus 308 configured to provide selective single carrier or multi-carrier UL transmission service for a mixed population of mobile devices, including mobile device 302. Particularly, mixed carrier management apparatus 308 can obtain UL transmit capabilities 322 pertaining to mobile device 302, and respective UL transmit capabilities of other mobile devices of the mixed population of mobile devices. Based at least in part on the respective UL transmit capabilities, mixed carrier management apparatus 308 identifies a first subset of the mobile devices limited to single carrier UL transmission, and a second subset of the mobile devices configured at least for multi-carrier UL transmission. The latter subset of the mobile devices can be limited to multi-carrier UL transmission, or devices that can selectively employ single or multi-carrier UL transmission (e.g., see single/multi carrier mobile device 202 of FIG. 2, supra).

Once the subsets of single carrier and multi-carrier devices are identified, mixed carrier management apparatus 302 can assign UL resources for the population of mobile devices based on single carrier and multi-carrier transmit capabilities. The respective schedules can be broadcast in one or more DL messages 308A to the mixed population of mobile devices, or individual DL messages 308A can be unicast to respective mobile devices of the mixed population of mobile devices. In at least one aspect, a suitable combination of broadcast and unicast messages can be employed to send the assigned UL resources to the population of mobile devices.

In addition to the foregoing, base station 304 can further comprise a power assignment module 312. In one aspect, power assignment module 312 specifies an UL transmit power for an UL transmission of mobile device 302 (e.g., where mobile device 302 is of the second subset of the mobile devices configured for multi-carrier UL transmission, or selective single or multi-carrier UL transmission). In this aspect, power assignment module 312 specifies a first UL transmit power value if the UL transmission is sent in a single-carrier fashion, and a second UL transmit power value if the UL transmission is sent in a multi-carrier fashion. Further, this second UL transmit power value can also comprise separate transmit power values for data transmission and for control transmission. Specifically, these separate transmit power values can comprise a data transmit power value that is applied to a data portion of the UL transmission and a control transmit power that is applied to a control portion of the UL transmission. In some cases, for instance where a total transmit power constraint necessitates separate single carrier transmission of the control portion and data portion, or where no transmit power constraint is specified, the data transmit power value and the control transmit power value can be the same power value. In other cases, the data transmit power value is different from the control transmit power value and the data portion and control portion are transmitted concurrently (in a multi-carrier UL transmission). Further, it should be appreciated that power assignment module 312 can provide separate UL transmit power values for each mobile device of the mixed population of mobile devices. Additionally, the UL transmit power values can be updated each transmission time slot, or for groups of transmission time slots, or another suitable time period.

Further to the above, base station 304 can comprise a precedence module 320 that establishes a priority for a subset of multi-carrier traffic transmitted by mobile device 302. The priority can be transmitted to mobile device 302 in DL message 308A, for instance. To continue the above example, this subset of multi-carrier traffic comprises a control portion or a data portion of multi-carrier traffic. However, other subsets of multi-carrier traffic can be delineated, based not only on traffic type, but QoS requirements, or based on separate streams of traffic, where suitable. In this case, priority can be established for one or more traffic types, QoS requirements or streams of traffic, or a suitable combination thereof.

The priority can be utilized to imply transmission precedence for single carrier transmission, or can be utilized to imply a transmit power preference in multi-carrier transmission. Thus, in one aspect, the priority implies that the control portion and the data portion are to be transmitted as separate single-carrier UL transmissions instead of concurrently as a multi-carrier transmission, and that the control portion is to be transmitted before the data portion (where the control portion has priority), or that the data portion is to be transmitted before the control portion (where the data portion has priority). For a multi-carrier transmission, the priority could be a priority that comprises a minimum transmit power for one or more types of traffic, or a transmit power ratio of control and data portions of multi-carrier traffic. Thus, where base station 304 conveys a transmit power constraint on mobile device 302, the transmit power ratio can be utilized by mobile device 302 to establish respective control transmit power values and data transmit power values for respective subsets of the multi-carrier traffic.

In yet another aspect, the priority could include an explicit transmit power command for one or more subsets of multi-carrier traffic. As one example, the priority establishes a minimum transmit power for a control portion of the multi-carrier traffic if mobile device 302 is constrained to a maximum transmit power, and further the priority implies that the data traffic is to be transmitted at a power equal to a difference of the maximum transmit power and the minimum transmit power. As a more specific example, for a transmit power constraint of 23 decibels per meter (db/m), a minimum transmit power of 21 db/m for priority traffic (e.g., the control portion) implies that the data portion is to be transmitted at a power equal to a difference of 23 db/m and 21 db/m. As an alternate example, the transmit power command can specify an increase or decrease to one or more subsets of the multi-carrier traffic. In this case, mobile device 302 will adjust the relative transmit powers of control and data portions, given the increase or decrease and a transmit power constraint. Thus, if mobile device 302 has a maximum power constraint of 23 db, the control portion might be transmitted at 20 db/m and the data portion might be transmitted at 20 db/m by default. If the transmit power command specifies an increase in 1 db/m for the control portion, mobile device 302 will transmit the control portion at 21 db/m, and the data portion at a difference of 23 db/m and 21 db/m.

Mobile device 302 can be a device configured for multi-carrier UL transmission or selective singe/multi-carrier UL transmission, as described above. To facilitate this capability, mobile devices 302 can comprise a carrier selection apparatus 310 that employs a wireless transceiver of mobile device 302 for obtaining DL message 308A on a DL from wireless link 306. Carrier selection apparatus 310 can select between single carrier and multi-carrier UL transmission based at least in part on information specified in DL message 308A. This information can comprise supported UL transmission schemes of base station 304, in one aspect, or particular power or traffic priority conditions, as described herein. Based on the selection, carrier selection apparatus 310 identifies a set of control information and a set of data information for UL transmission by the wireless transceiver of mobile device 302, and assigns the set of control information and the set of data information to either one subframe (or other suitable transmission time slot) for single carrier UL transmission, or to multiple subframes, for multi-carrier UL transmission.

Additionally, mobile device 302 can comprise a power module 314 that assigns respective UL transmit powers to the set of control information and the set of data information. This can be accomplished via a first power control loop, power control loop$_1$ 316, that establishes a control transmit power for the set of control information, and a second power control loop, power control loop$_2$ 318, that establishes a data transmit power for the set of data information. In at least one aspect, power module 314 determines respective values of the respective UL transmit powers from a power constraint and a relative priority provided by base station 304, as described herein or as known in the art. The power constraint can be a maximum power capacity of mobile device 302, or a maximum transmit power imposed by base station 304 (e.g., to reduce UL interference). As one particular example, power module 314 establishes the set of control information or the set of data information as a priority transmission based on the relative priority, and identifies a minimum transmit power specified for the priority transmission (e.g., as specified by base station 304, whether specified as an explicit value, or an increase or decrease of a previous value, or the like). Power module 314 then assigns the minimum transmit power (e.g., 21 db/m) to the priority transmission, and assigns a difference of the minimum transmit power and the power constraint (e.g., 23 db/m) to a non-priority transmission.

Figure 4:
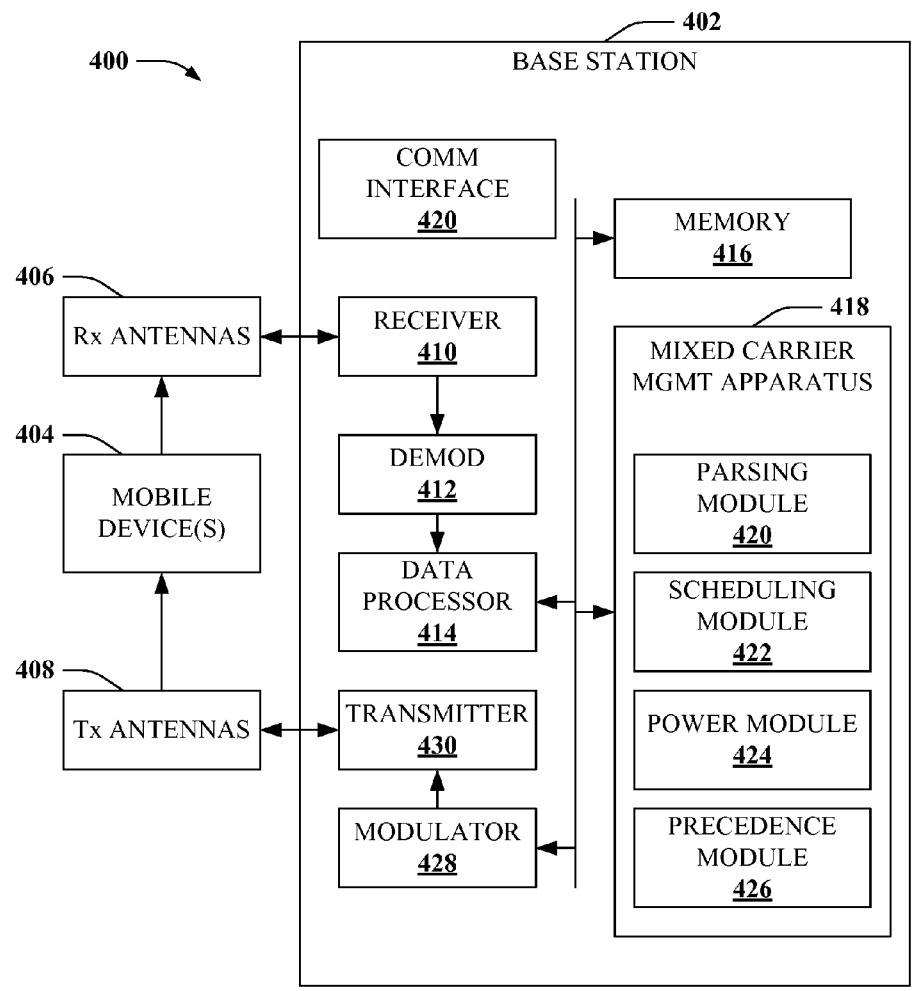
FIG. 4 illustrates a block diagram of an example wireless system comprising a base station that provides single and multi carrier uplink communication.

FIG. 4 illustrates a block diagram of an example system 400 comprising a base station 402 according to particular aspects of the subject disclosure. In some aspects, base station 402 can be configured to provide wireless communication based on a single carrier or a multi-carrier UL. The UL can comprise a modulation technique that supports multi-carrier UL transmission, such as OFDM, or single carrier and multi-carrier, such as FDMA. In some aspects, base station 402 can be configured to provide differential services for a mixed population of mobile devices 404, based on UL transmit capabilities of the respective devices. Accordingly, base station 402 can help bridge a gap between legacy mobile devices and newer mobile devices having different UL capabilities.

Base station 402 (e.g., access point, . . . ) can comprise a receiver 410 that obtains wireless signals from mobile devices 404 through one or more receive antennas 406, and a transmitter 430 that sends coded/modulated wireless signals provided by modulator 428 to mobile devices 404 through a transmit antenna(s) 408. Receive antenna(s) 406 and transmit antenna(s) 408, along with receiver 410 and transmitter 422, can comprise a set of wireless transceivers for implementing wireless data exchange with mobile devices 404, as described herein.

Receiver 410 can obtain information from receive antennas 406 and can further comprise a signal recipient (not shown) that receives uplink data transmitted by mobile devices 404. Additionally, receiver 410 is operatively associated with a demodulator 412 that demodulates received information. Demodulated symbols are analyzed by a data processor 414. Data processor 414 is coupled to a memory 416 that stores information related to functions provided or implemented by base station 402.

In particular, base station 402 can comprise a mixed carrier management apparatus 418 that provides selective UL transmission scheduling for respective mobile devices of the mixed population of mobile devices 404. Particularly, a parsing module 420 can be employed that identifies a first subset of the mobile devices 404 limited to single carrier UL transmission and a second subset of the mobile devices 404 configured at least for multi-carrier UL transmission. Further, a scheduling module 422 can be employed that assigns UL resources for the set of mobile devices based on single carrier and multi-carrier transmit capabilities of the first subset of the mobile devices and the second subset of the mobile devices, respectively. In additional aspects, mixed carrier management apparatus 418 can further comprise a power assignment module 424 that specifies an UL transmit power for an UL transmission of a mobile device of the second subset of the mobile devices, where the UL transmit power can comprise a first UL transmit power value for single carrier transmissions, and a second UL transmit power value for multi-carrier transmissions. In at least one aspect, the second UL transmit power can further comprise a data transmit power value to be applied for a data portion of an UL multi-carrier transmission, and a control transmit power value to be applied for a control portion of the UL multi-carrier transmission.

Further to the above, mixed carrier management apparatus 418 can comprise a precedence module 426 that establishes a priority for a subset of multi-carrier traffic transmitted by the mobile device. In such case, power assignment module 424 can specify the UL transmit power in the context of priority traffic versus non-priority traffic, providing separate transmit powers for different subsets of traffic. In this manner, mixed carrier management apparatus 418 can provide flexible control of UL transmissions for the mixed population of single carrier and multi-carrier mobile devices 404, managing UL transmit power of respective types of transmissions, as well as transmission priority. This can facilitate full spectrum bandwidth in each transmission time slot for multi-carrier devices, while still maintaining effective communication for single carrier devices.

Figure 5:
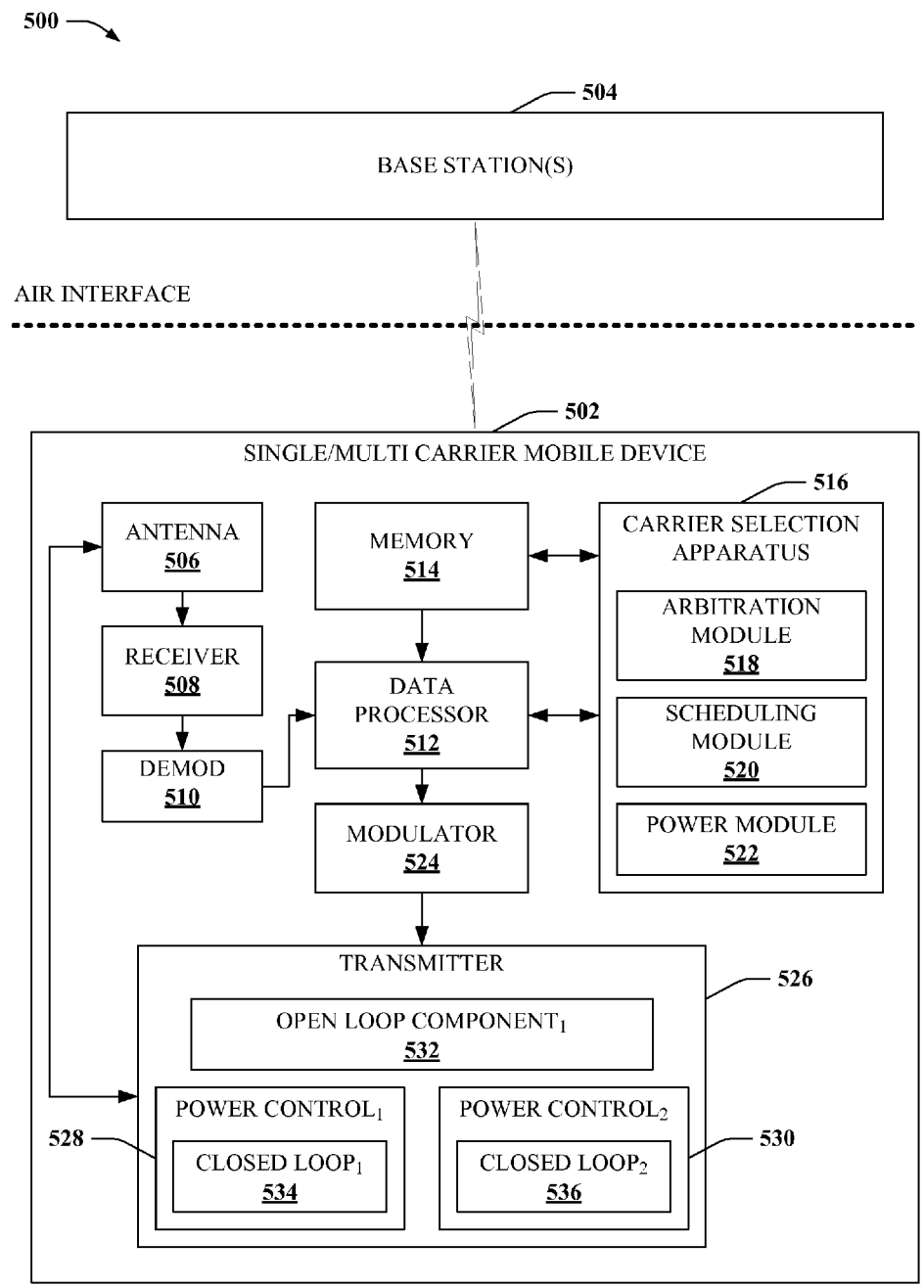
FIG. 5 depicts a block diagram of a sample wireless system comprising a mobile terminal configured for selective single and multi-carrier uplink transmission.

FIG. 5 illustrates a block diagram of an example system comprising mobile device 502 configured for wireless communication according to aspects of the subject disclosure. Mobile device 502 can be configured to wirelessly couple with one or more base stations 504 (e.g., access point) of a wireless network (e.g., an LTE wireless network, an LTE-A wireless network, an ultra wideband (UWB) wireless network, and so forth). Based on such configuration, mobile device 502 can receive wireless signals from base station(s) 504 on a forward link channel and respond with wireless signals on a reverse link channel. In addition, mobile device 502 can comprise instructions stored in memory 514 for operating in a multi-carrier UL fashion. In particular aspects, mobile device 502 can also comprise instructions stored in memory 514 for selecting between single carrier and multi-carrier UL transmission, based on various conditions. Such conditions can include capabilities of base station(s) 504, power constraints of mobile device 502, power constraints imposed by base station(s) 504, priority of subsets of UL transmissions, or the liken.

Mobile device 502 includes at least one antenna 506 (e.g., a wireless transmission/reception interface or group of such interfaces comprising an input/output interface) that receives a signal and receiver(s) 508, which performs typical actions (e.g., filters, amplifies, down-converts, etc.) on the received signal. In general, antenna 506 and a transmitter 526 (collectively referred to as a transceiver) can be configured to facilitate wireless data exchange with base station(s) 504. Further, antenna 506, receiver 508, and transmitter 526, as well as demodulator 510 and modulator 524, can form a set of wireless transceivers for implementing the data exchange between base station(s) 504 and mobile device 502.

Antenna 506 and receiver(s) 508 can be coupled with demodulator 510 that can demodulate received symbols and provide such signals to a data processor(s) 512 for evaluation. It should be appreciated that data processor(s) 512 can control and/or reference one or more components (antenna 506, receiver 508, demodulator 510, memory 514, carrier selection apparatus 516, modulator 524, transmitter 526) of mobile device 502. Further, data processor(s) 512 can execute one or more modules, applications, engines, or the like (carrier selection apparatus 516) that comprise information or controls pertinent to executing functions of mobile device 502. For instance, such functions can include multi-carrier UL operation, selective single-carrier or multi-carrier operation, distinct power control for control and data transmissions in a common subframe, and so on, as described herein.

Additionally, memory 514 of mobile device 502 is operatively coupled to data processor(s) 512. Memory 514 can store data to be transmitted, received, and the like, and furthermore can store instructions for facilitating multi-carrier UL transmission with base station(s) 504. Data processor 512 and memory 514 can be communicatively coupled with a carrier selection apparatus 516. In one aspect of the subject disclosure, carrier selection apparatus 516 can be configured to enable transmission of PUCCH and PUSCH in a single UL subframe, when operating in a suitable LTE wireless environment for instance (e.g., an LTE network conforming to LTE Rel-9 standards, LTE Rel-10 standards, or like standards configured for multi-carrier UL operation).

According to additional aspects, carrier selection apparatus 516 can be employed to enable UL transmission for mobile device 502 in a single carrier manner, multi-carrier manner, or selective single carrier or multi-carrier manner. Particularly, an arbitration module 518 can be employed that selects between single carrier and multi-carrier uplink transmission. Selection between single carrier and multi-carrier UL transmission can be based at least in part on a command from base station(s) 504, at least in part on a transmit power constraint established by base station(s) 504, or a traffic priority established by base station(s) 504, or a like condition or constraint, or a suitable combination thereof. Additionally, a scheduling module 520 can be employed that assigns a first set of information and a second set of information to a single UL subframe for multi-carrier transmission, or to disparate UL subframes for single carrier transmission, to implement the selection of arbitration module 518. The respective sets of information can comprise suitable disparate sets of wireless information that would exceed single carrier restraints if transmitted in a single UL subframe, such as a set of control information (e.g., PUCCH message) and a set of data information (e.g., PUSCH message). As a particular example, scheduling module 520 can transmit the set of control information on a first set of frequency resources in an uplink subframe or subslot, and transmit the set of data information on second set of frequency resources that are contiguous to the first set of frequency resources. In at least one aspect of this example, UL control and data information can be assigned to an entire frequency spectrum to avoid loss of usable spectrum bandwidth for this signal subframe/subslot. Thus, for an uplink subframe or subslot that is allocated to control and data traffic, scheduling module 520 assigns the set of control information and the set of data information to an entire spectrum bandwidth of the uplink subframe or subslot.

In addition to the foregoing, carrier selection apparatus 516 can comprise a power module 522 that assigns respective uplink transmit powers to disparate sets of information. These respective transmit powers can be generated by transmitter 526. Particularly, a first power control loop 528 establishes a first transmit power for the first set of information (e.g., a control transmit power for a set of control information) and a second power control loop 530 establishes a second transmit power for the second set of information (e.g., a data transmit power for the set of data information). Note that the first transmit power and the second transmit power can have the same value, or can be different values, as specified by power module 522. To generate respective values, first power control loop 528 and second power control loop 530 employ an open loop component 532 for power loss estimates, and employ respective closed loop components, closed loop component$_1$ 534 and closed loop component$_2$ 536, to generate respective base transmit powers for the first transmit power and the second transmit power, respectively. It is to be understood that open loop as utilized herein refers in general to open-loop control theory (also referred to as non-feedback control theory), which generates an output based only on a current state and a system model. Open loop power generation therefore refers to power generation based solely on an input parameter (e.g., power loss across a wireless channel) without utilizing feedback of the power generation system. In contrast, closed loop refers to a feedback-based control theory in which an output power is fed back to a power controller in conjunction with an input parameter (e.g., a target baseline power), to optimize the output power. Closed-loop power generation can therefore optimize an output based on the input parameter even if some perturbation is affecting the output, such as component noise resulting from variations in resistance or capacitance of a resistor-capacitor circuit utilized to measure, generate or filter a power system.

In operation, open loop component 532 estimates a receive power loss at antenna 506 and receiver 508 for signals transmitted by base station(s) 504. This estimate provides an indication of power loss in a wireless channel that communicatively couples mobile device 502 and base station(s) 504. The power loss estimation can be inverted to offset this power loss. Thus, open loop component 532 utilizes the estimate and generates an uplink power offset to compensate for power loss between the mobile device 302 and base station(s) 504. Additionally, power module 522 decodes a base transmit power(s) for UL transmissions made by transmitter 526. Thus, for the example involving a set of control information and a set of data information, power module 522 decodes a base data transmit power and a base control transmit power from respective data and control power commands obtained from base station(s) 504. The respective base transmit powers are provided for transmitter 526 (e.g., via data processor 512 and modulator 524). First power control loop 528 combines the uplink power offset with the base control transmit power generated by first closed loop component 534 to derive the control transmit power. Likewise, second power control loop 530 combines the uplink power offset and the base data transmit power generated by second closed loop component 536 to derive the data transmit power.

The aforementioned systems or apparatuses have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a system could include single/multi carrier mobile device 502 comprising carrier selection apparatus 516, and transmitter 526, and base station 402, comprising mixed carrier management apparatus 418, or a different combination of these or other modules. Sub-modules could also be implemented as modules communicatively coupled to other modules rather than included within parent modules. Additionally, it should be noted that one or more modules could be combined into a single module providing aggregate functionality. For instance, arbitration module 216 can include scheduling module 218, or vice versa, to facilitate selecting between single and multi-carrier UL transmission and assigning UL control and data transmissions based on the selection, by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 6-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 6:
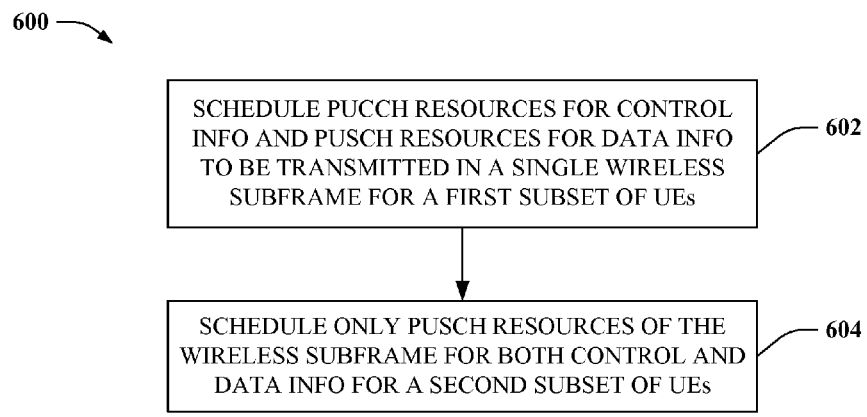
FIG. 6 illustrates a flowchart of an example methodology for providing mixed single and multi-carrier wireless communication according to additional aspects.

FIG. 6 illustrates a flowchart of an example methodology 600 providing wireless communication in a multi-carrier UL environment (e.g., an LTE-Advanced wireless network), according to aspects of the subject disclosure. At 602, method 600 can comprise scheduling PUCCH resources of a wireless subframe for control information to be transmitted in the wireless subframe and PUSCH resources of the wireless subframe for data information to be transmitted in the wireless subframe. Particularly, the scheduling can be provided for a first subset of a population of mobile devices that are not limited to single-carrier UL operation. For instance, this first subset of the population of mobile devices can comprise mobile devices configured for an LTE-Advanced wireless system that employs a multi-carrier UL channel.

At 604, method 600 can comprise scheduling only PUSCH resources of the wireless subframe for both control information and data information to be transmitted in the wireless subframe for a second subset of the population of mobile devices. This scheduling can accommodate mobile devices limited to single-carrier UL transmissions. For instance, the second subset of the population of mobile devices can comprise devices configured for LTE Rel-8, or the like, based on a single-carrier UL channel.

In operation, assigning UL resources for the first subset of the population of mobile devices can comprise assigning separate and contiguous UL frequency resources for concurrent transmission of data information and of control information. For instance, method 600 can further comprise assigning the PUSCH resources and the PUCCH resources to separate and contiguous UL frequency resources. Particularly, the separate and contiguous UL frequency resources can extend across most or all of UL bandwidth available for control or data transmission. This assignment will generally break single carrier constraints, and thus is generally not suitable for the second subset of the population of mobile devices.

For the second subset of the population of mobile devices, assigning UL resources can further comprise assigning a single contiguous block of UL frequency resources within a common UL signal timeframe (e.g., a subframe, subslot, or other suitable transmission time slot) for transmission of either data information or of control information to meet the single carrier constraint. Alternatively, assigning UL resources can further comprise assigning a single contiguous block of UL frequency resources within a common UL signal timeframe for transmission of both data information and control information to meet the single carrier constraint. For instance, control information can be inserted within data information in a resource block reserved for data traffic (e.g., in a similar fashion as SC-FDMA UL employed by LTE Release 8), or vice versa.

In some aspects of the subject disclosure, method 600 can further comprise generating separate transmit powers for a set of UL control information and a set of UL data information for one or more mobile devices of the first subset of the population of mobile devices. For instance, separate transmit powers can be based on prioritizing a power setting for the control information on the PUCCH resources over a power setting for the data information on the PUSCH resources, for the first subset of the population of mobile devices. In one particular aspect, the separate transmit powers apply to concurrent transmission of the set of UL control information and the set of UL data information. This can enable data and control transmissions, in a single subframe, to be transmitted at different respective powers. In another aspect, generating separate transmit powers further comprises specifying a baseline transmit power and an offset transmit power for the set of UL control information, and specifying a baseline transmit power and an offset transmit power for the set of UL data information. Alternatively, generating separate transmit powers can instead comprise specifying an update to a previous baseline transmit power provided to one or more of the mobile devices of the second subset of the population of mobile devices. Suitable updates can include increasing the previous baseline transmit power, decreasing the previous baseline transmit power, making no change to the previous baseline transmit power, and so on. As yet another alternative, the baseline transmit powers can be sent without the offset transmit powers. In this alternative, respective mobile devices can calculate suitable transmit power offsets based on estimates of power loss on the DL.

Figure 7:
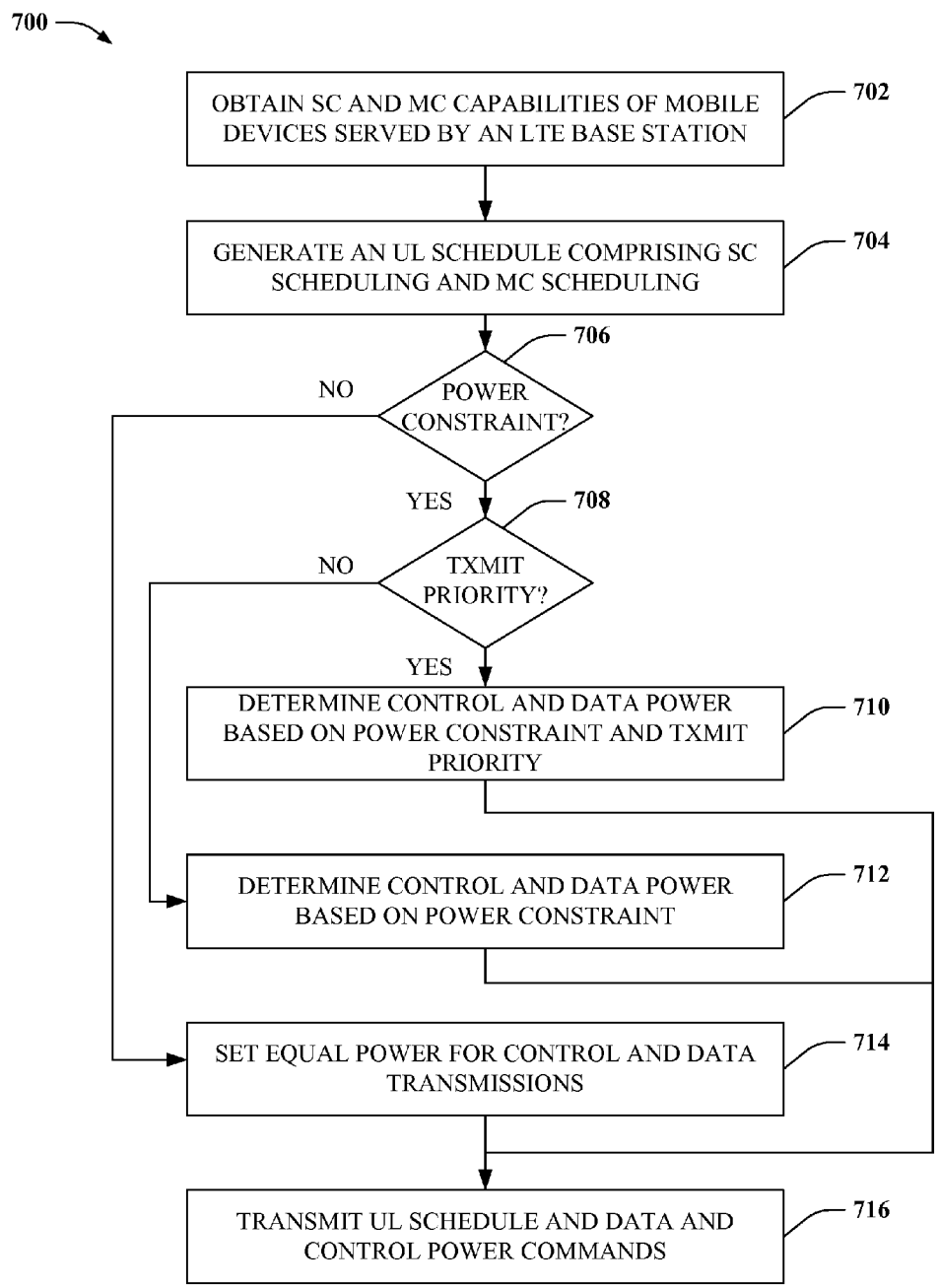
FIG. 7 depicts a flowchart of a sample methodology providing uplink scheduling and power assignment for mixed single and multi-carrier environments.

FIG. 7 illustrates a flowchart of an example methodology 700 according to still other aspects of the subject disclosure. At 702, method 700 can comprise obtaining single carrier and multi-carrier capabilities of mobile devices served by an LTE base station. At 704, method 700 can comprise generating an UL transmission schedule comprising single carrier scheduling and multi-carrier scheduling, for one or more of the mobile devices, based at least in part on respective single carrier or multi-carrier capabilities of such mobile devices. Additionally, at 706, method 700 can make a determination as to whether an UL transmit power constraint is imposed on at least one mobile device. Identifying the UL transmit power constraint can comprise referencing an UL wireless protocol employed for the LTE base station of standardized power constraints, receiving maximum transmit power capabilities from the mobile device, and comparing previous transmit power(s) to the maximum transmit power, obtaining a higher level power constraint, for interference mitigation or cancellation routines for instance, and so on. If the power constraint exists, method 700 proceeds to 714; otherwise, method 700 proceeds to 708.

At 708, method 700 can make another determination as to whether a transmission priority is established for traffic involving the at least one mobile device. If no transmission priority is established, method 700 can proceed to 712; otherwise method 700 proceeds to 710. At 710, method 700 determines baseline control and data transmit powers for UL transmissions of the at least one mobile device, based on an existing power constraint(s) or transmission priority. In one aspect, applying the transmission priority further comprises giving transmit power priority (e.g., higher transmit power, if a conflict between target transmit power and the power constraint exists) to control transmissions to satisfy the UL transmit power constraint for the second subset of the population of mobile devices. As an alternative, however, method 700 can instead comprise giving transmit power priority to data transmissions to satisfy the UL transmit power constraint for such mobile devices. The latter aspect might be desirable for elevated QoS traffic, such as VoIP traffic, or the like.

At 712, method 700 determines UL control and data transmit powers for a mobile device(s) having a power constraint, but no identified transmission priority. The respective control and data transmit powers can be set to equal values, if permitted by the power constraint, or to different values, depending on power loss on a particular frequency subband, for instance, or other suitable condition (e.g., relative QoS). At 714, method 700 can set equal power for control and data transmissions for mobile devices having no power constraint and no transmission priority. Once the transmission baseline control and data transmit powers are determined, method 700 can proceed to 716, where the UL transmission schedule and data and control power commands are transmitted to respective mobile devices of the population of mobile devices. It should be appreciated that method 700 can be implemented for each subframe, each signal frame, or other suitable time period for wireless communications.

Figure 8:
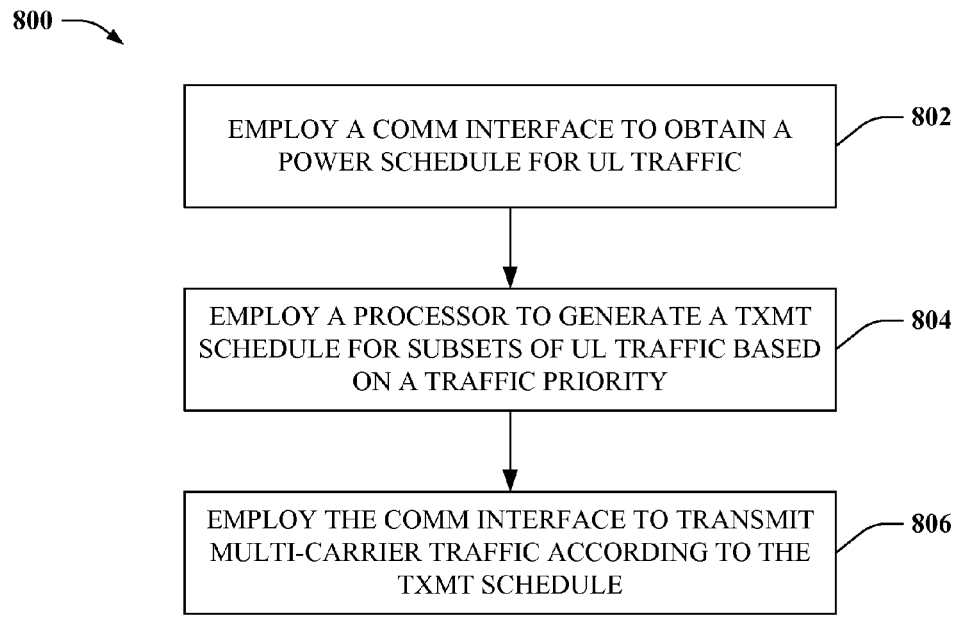
FIG. 8 illustrates a flowchart of a sample methodology for wireless communication in a frequency division multiple access (FDMA) uplink system.

FIG. 8 depicts a flowchart of a sample methodology 800 for providing multi-carrier UL operation in wireless communication. In at least one aspect of the subject disclosure, method 800 can be implemented in a third generation partnership project long term evolution wireless communication system, or related systems (e.g., LTE-A). At 802, method 800 can comprise employing a communication interface to obtain a power schedule for transmission of UL traffic on an FDMA UL. At 804, method 800 can comprise employing a data processor to generate a transmission schedule for respective subsets of the UL traffic according to a traffic priority assigned to one subset of the UL traffic that is specified in the power schedule. At 806, method 800 can comprise employing the communication interface to transmit multi-carrier UL traffic according to the transmission schedule. For instance, this can comprise transmitting respective subsets of UL traffic concurrently on the FDMA UL, in a manner that breaks single carrier constraints. In one aspect, this can comprise transmitting a data portion of the UL traffic and a control portion of the UL traffic in a common time subframe or time subslot. Additionally, this transmitting can further comprise employing a full spectrum bandwidth of the FDMA UL during the time subframe or time subslot, leading to increased UL efficacy. Thus, in one instance, control traffic and data traffic are transmitted in a single subframe and across a full bandwidth of the FDMA UL that is allocated to control or data traffic, accomplishing multi-carrier transmission.

In other aspects of the subject disclosure, generating the transmission schedule can include establishing a higher importance for one or more portions of the UL traffic (e.g., for a control portion of the UL traffic). This can be accomplished by obtaining a target transmit power from the power schedule and applying the target transmit power for transmission of the control portion. For the data portion, method 800 can comprise calculating a transmit power remainder from the difference of the target transmit power and a transmit power constraint, and applying the transmit power remainder to a non-control portion of the UL traffic, such as the data portion.

In at least one aspect, method 800 can comprise selecting between multi-carrier and single carrier transmission based on a constraint, such as the power constraint, or a QoS constraint, or the like. As an example, establishing the higher importance for the control portion of the UL traffic can further comprising transmitting the control portion and a second portion of the UL traffic as separate single carrier transmissions, where multi-carrier transmission does not meet the constraint. In such case, a single carrier transmission comprising the control portion is transmitted prior to a single carrier transmission comprising the second portion, if the control portion is established as higher importance traffic.

Figure 9:
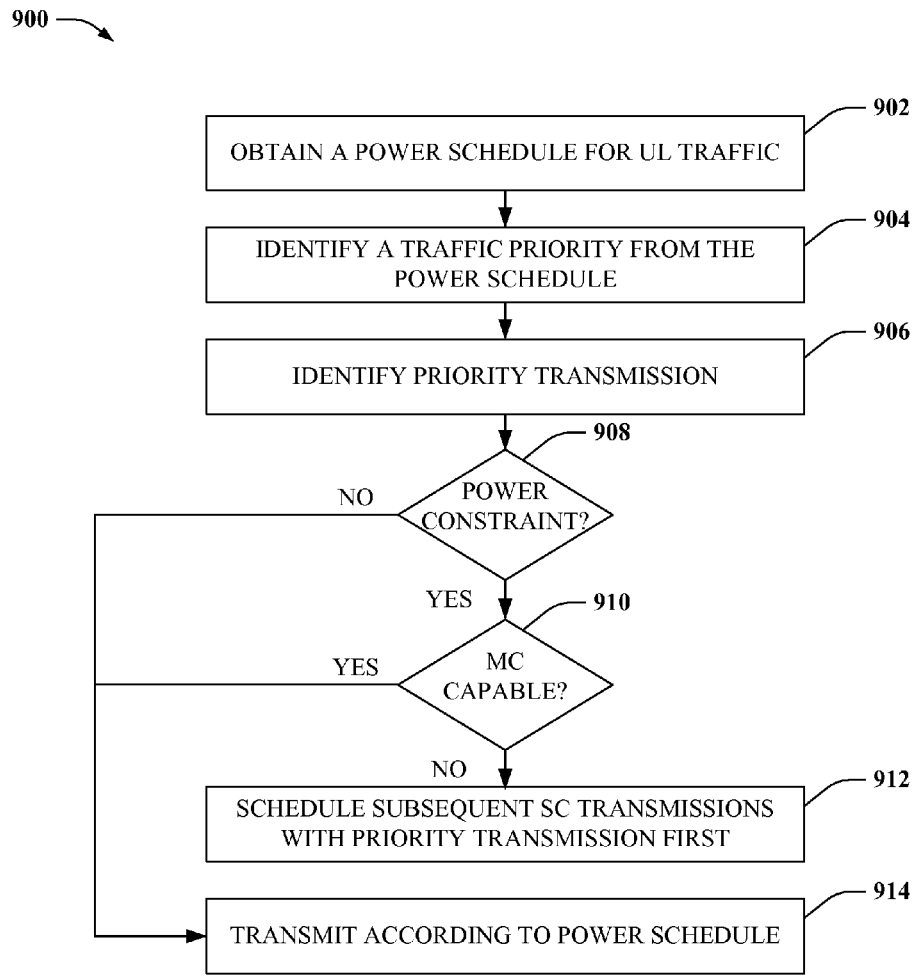
FIG. 9 illustrates a flowchart of an example methodology for selecting single and multi-carrier uplink transmission according to particular aspects.

FIG. 9 depicts a flowchart of an example methodology 900 for providing selective single carrier and multi-carrier UL operation in wireless communication. At 902, method 900 can comprise obtaining a power schedule for UL traffic transmission. The power schedule can be a schedule that assigns or updates respective transmit powers for different subsets of the UL traffic transmission. Additionally, the power schedule can be a schedule that allocates particular UL resources to different subsets of the UL traffic transmission. Further, the subsets of the UL traffic can be differentiated by traffic type, such as control traffic or data traffic, QoS level, such as elevated QoS or best effort QoS, streams of traffic associated with a particular voice or data communication, or the like, or a suitable combination thereof.

At 904, method 900 can comprise identifying a traffic priority from the power schedule. The traffic priority can indicate a transmission precedence for one or more subsets of the UL traffic, where the transmission precedence requires prior single carrier transmission, higher power priority, or higher QoS priority, as specified by wireless protocols governing the wireless communication.

At 906, method 900 can comprise determining whether a power constraint exists for one or more subsets of the UL traffic. If not, method 900 can proceed to 914, where the UL traffic is transmitted in multi-carrier fashion, utilizing transmit powers specified in the power schedule. Otherwise, method 900 proceeds to 910.

At 910, method 900 can comprise determining whether the power constraint permits multi-carrier transmission. If so, method 900 can proceed to 914 to transmit the UL traffic in multi-carrier fashion. Otherwise, method 900 proceeds to 912 and schedules one or more subsets of the UL traffic in subsequent single carrier transmissions to comply with the power constraint. Further, the order of the subsequent single carrier transmissions is governed by the traffic priority, if any. Method 900 can end after transmitting the UL traffic, whether as a multi-carrier transmission or the subsequent single carrier transmissions.

Figure 10:
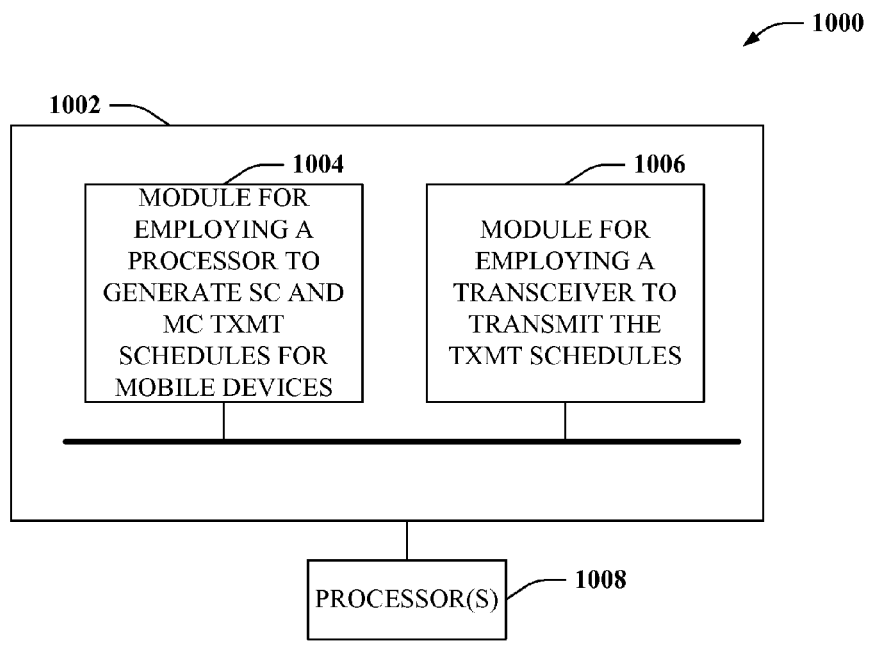
FIG. 10 depicts a block diagram of a sample apparatus that serves a mixed population of single and multi-carrier devices in wireless communication.
Figure 11:
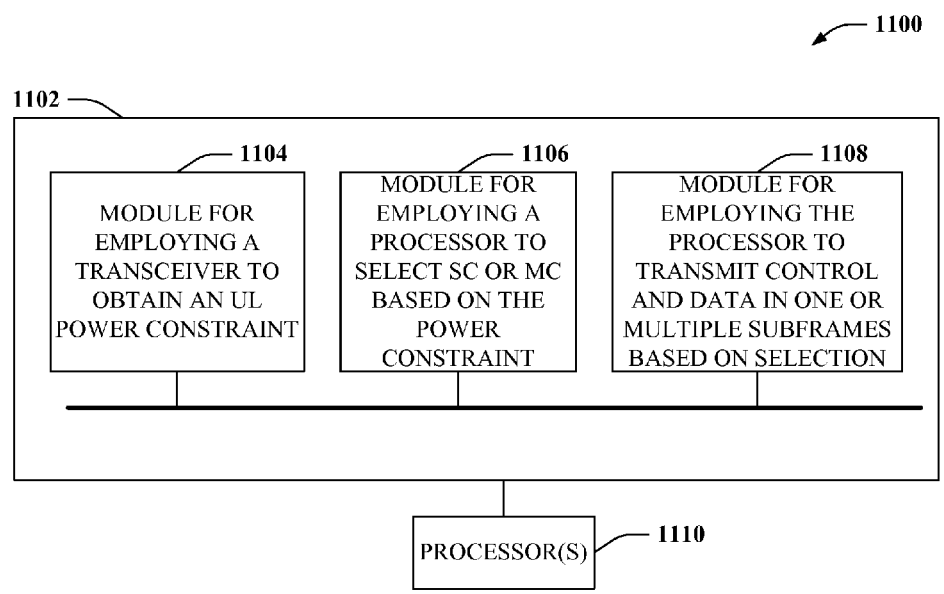
FIG. 11 illustrates a block diagram of an example apparatus that incorporates selective single and multi-carrier uplink transmission.

FIGS. 10 and 11 illustrate respective example apparatuses 1000, 1100 for implementing improved acknowledgment and re-transmission protocols for wireless communication according to aspects of the subject disclosure. For instance, apparatuses 1000, 1100 can reside at least partially within a wireless communication network and/or within a wireless receiver such as a node, base station, access point, user terminal, personal computer coupled with a mobile interface card, or the like. It is to be appreciated that apparatuses 1000, 1100 are represented as including functional blocks, which can be functional blocks that represent functions implemented by a processor, software, or combination thereof (e.g., firmware).

Apparatus 1000 comprises memory 1002 for storing modules or instructions configured to execute functions of apparatus 1000, including management of single carrier and multi-carrier UL transmissions of a mixed population of single carrier and multi-carrier mobile communication devices. Further, apparatus 1000 can comprise a module 1004 for employing a processor to generate an UL transmission schedule for a population of mobile devices. Particularly, processor 1008 assigns UL resources to a first subset of the population of mobile devices based on a single carrier constraint, and assigns UL resources to a second subset of the population of mobile devices without the single carrier constraint. In addition to the foregoing, apparatus 1000 can comprise a module 1006 for employing a wireless transceiver to transmit the UL transmission schedule on a DL to the population of mobile devices. Upon receiving the UL transmission schedule, respective mobile devices can execute respective UL transmissions as specified in the UL transmission schedule.

Apparatus 1100 comprises memory 1102 for storing modules or instructions configured to execute functions of apparatus 1100, including selecting single carrier or multi-carrier UL operation in wireless communication. Apparatus 1100 can comprise a module 1104 for employing a wireless transceiver to obtain an UL power constraint from a wireless network. For instance, the UL power constraint can be obtained from a DL transmission initiated at the wireless network, and received over a wireless channel coupling apparatus 1100 and the wireless network. Additionally, apparatus 1100 can comprise a module 1106 for employing a data processor 1110 to select between single carrier and multi-carrier UL transmission based at least in part on the UL power constraint. Further, apparatus 1100 can comprise a module 1108 for employing data processor 1110 to identify a set of control information and a set of data information for UL transmission by the apparatus and to assign the set of control information and the set of data information to either one subframe for a multi-carrier selection, or to multiple subframes for a single carrier selection.

Figure 12:
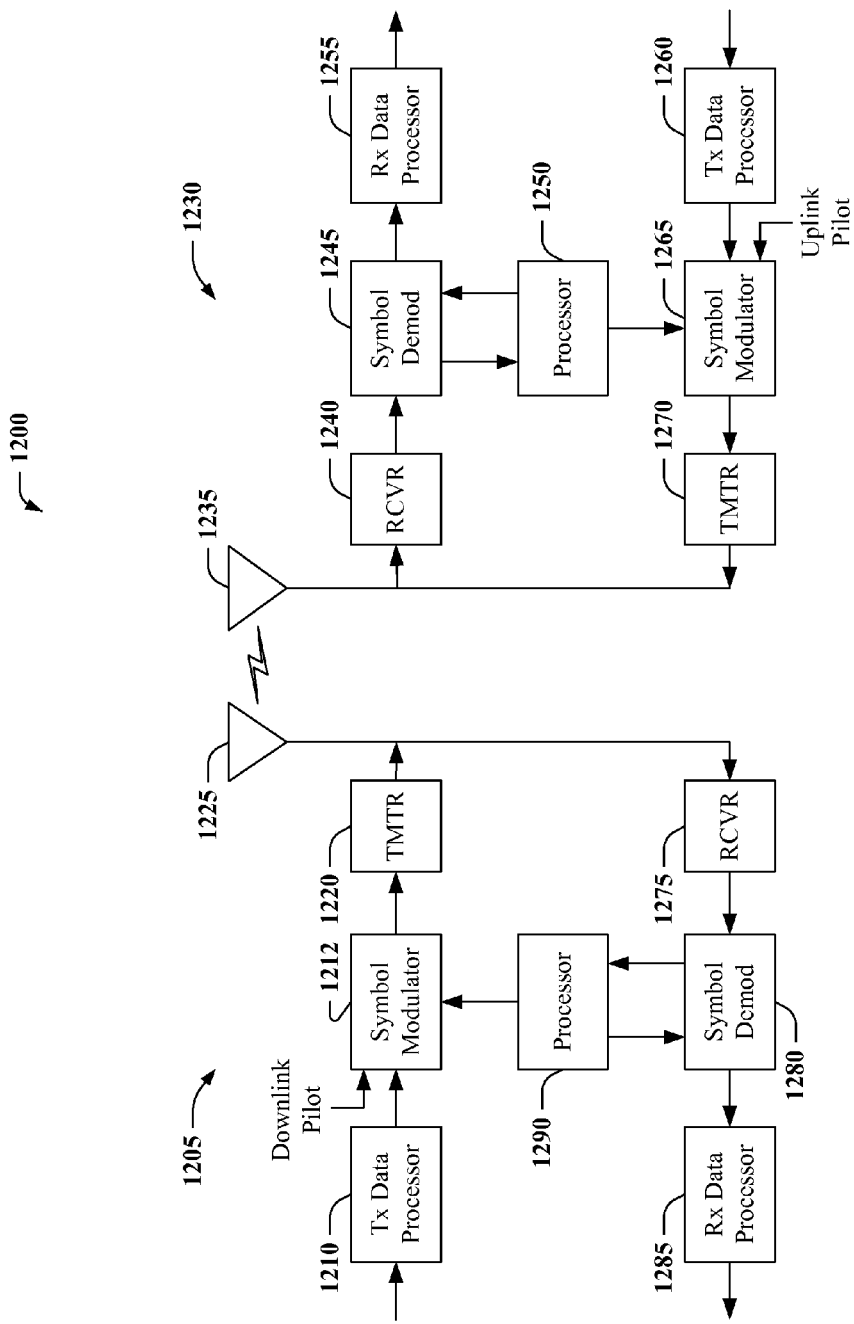
FIG. 12 depicts a block diagram of a sample wireless communications apparatus that can implement various aspects of the subject disclosure.

FIG. 12 depicts a block diagram of an example system 1200 that can facilitate wireless communication according to some aspects disclosed herein. On a DL, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. A symbol modulator 1215 multiplexes data and pilot symbols and provides them to a transmitter unit (TMTR) 1220. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1220 receives and converts the stream of symbols into one or more analog signals and further conditions (e.g., amplifies, filters, and frequency upconverts) the analog signals to generate a DL signal suitable for transmission over the wireless channel. The DL signal is then transmitted through an antenna 1225 to the terminals. At terminal 1230, an antenna 1235 receives the DL signal and provides a received signal to a receiver unit (RCVR) 1240. Receiver unit 1240 conditions (e.g., filters, amplifies, and frequency downconverts) the received signal and digitizes the conditioned signal to obtain samples. A symbol demodulator 1245 demodulates and provides received pilot symbols to a processor 1250 for channel estimation. Symbol demodulator 1245 further receives a frequency response estimate for the DL from processor 1250, performs data demodulation on the received data symbols to obtain data symbol estimates (which are estimates of the transmitted data symbols), and provides the data symbol estimates to an RX data processor 1255, which demodulates (i.e., symbol demaps), deinterleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the UL, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an UL signal, which is transmitted by the antenna 1235 to the access point 1205. Specifically, the UL signal can be in accordance with SC-FDMA requirements and can include frequency hopping mechanisms as described herein.

At access point 1205, the UL signal from terminal 1230 is received by the antenna 1225 and processed by a receiver unit 1275 to obtain samples. A symbol demodulator 1280 then processes the samples and provides received pilot symbols and data symbol estimates for the UL. An RX data processor 1285 processes the data symbol estimates to recover the traffic data transmitted by terminal 1230. A processor 1290 performs channel estimation for each active terminal transmitting on the UL. Multiple terminals can transmit pilot concurrently on the UL on their respective assigned sets of pilot sub-bands, where the pilot sub-band sets can be interlaced.

Processors 1290 and 1250 direct (e.g., control, coordinate, manage, etc.) operation at access point 1205 and terminal 1230, respectively. Respective processors 1290 and 1250 can be associated with memory units (not shown) that store program codes and data. Processors 1290 and 1250 can also perform computations to derive frequency and time-based impulse response estimates for the UL and DL, respectively.

For a multiple-access system (e.g., SC-FDMA, FDMA, OFDMA, CDMA, TDMA, etc.), multiple terminals can transmit concurrently on the UL. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal.

The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1290 and 1250.

Figure 13:
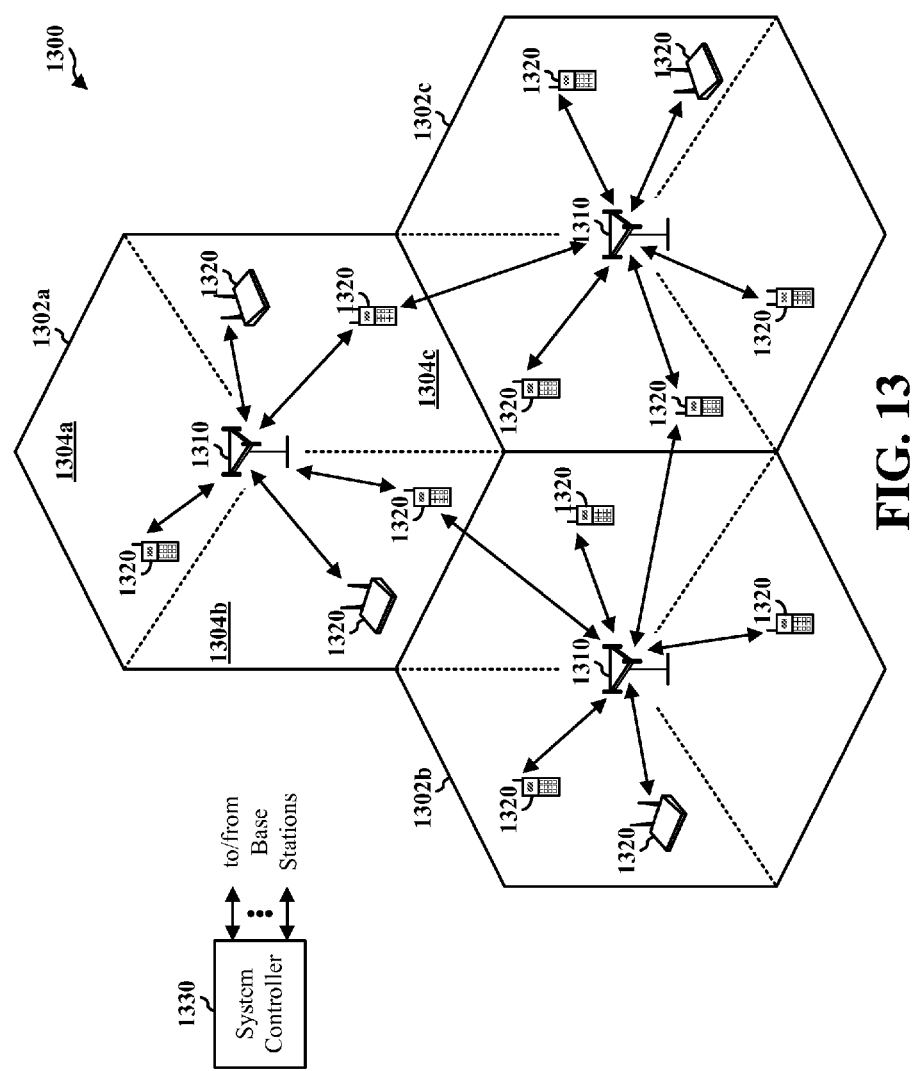
FIG. 13 illustrates a block diagram of a sample cellular environment for wireless communications according to further aspects.

FIG. 13 illustrates a wireless communication system 1300 with multiple base stations (BSs) 1310 (e.g., wireless access points, wireless communication apparatus) and multiple terminals 1320 (e.g., ATs), such as can be utilized in conjunction with one or more aspects. A BS 1310 is generally a fixed station that communicates with the terminals and can also be called an access point, a Node B, or some other terminology. Each BS 1310 provides communication coverage for a particular geographic area or coverage area, illustrated as three geographic areas in FIG. 13, labeled 1302a, 1302b, and 1302c. The term "cell" can refer to a BS or its coverage area depending on the context in which the term is used. To improve system capacity, a BS geographic area/coverage area can be partitioned into multiple smaller areas (e.g., three smaller areas, according to cell 1302a in FIG. 13), 1304a, 1304b, and 1304c. Each smaller area (1304a, 1304b, 1304c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1320 are typically dispersed throughout the system, and each terminal 1320 can be fixed or mobile. Terminals 1320 can also be called a mobile station, user equipment, a user device, wireless communication apparatus, an access terminal, a user terminal or some other terminology. A terminal 1320 can be a wireless device, a cellular phone, a personal digital assistant (PDA), a wireless modem card, and so on. Each terminal 1320 can communicate with zero, one, or multiple BSs 1310 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1330 couples to base stations 1310 and provides coordination and control for BSs 1310. For a distributed architecture, BSs 1310 can communicate with one another as needed (e.g., by way of a wired or wireless backhaul network communicatively coupling the BSs 1310). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 14:
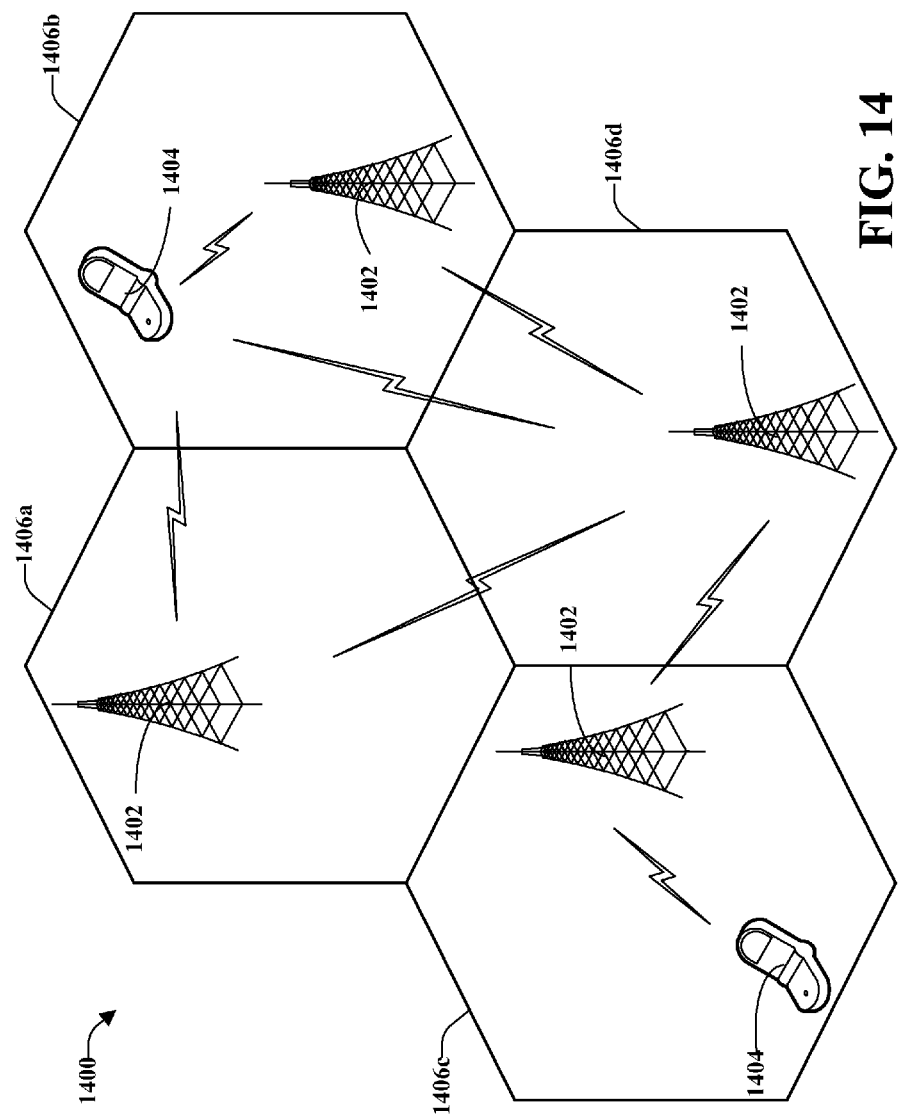
FIG. 14 depicts a block diagram of an example cell-based wireless communication arrangement suitable for one or more disclosed aspects.

FIG. 14 is an illustration of a planned or semi-planned wireless communication environment 1400, in accordance with various aspects. Wireless communication environment 1400 can comprise one or more BSs 1402 in one or more cells and/or sectors that receive, transmit, repeat, etc., wireless communication signals to each other and/or to one or more mobile devices 1404. As illustrated, each BS 1402 can provide communication coverage for a particular geographic area, illustrated as four geographic areas, labeled 1406*a*, 1406*b*, 1406*c* and 1406*d*. Each BS 1402 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 13, supra), as will be appreciated by one skilled in the art. Mobile devices 1404 can be, for example, cellular phones, smart phones, laptops, handheld communication devices, handheld computing devices, satellite radios, global positioning systems, PDAs, or any other suitable device for communicating over wireless communication environment 1400. Wireless communication environment 1400 can be employed in conjunction with various aspects described herein in order to facilitate mixed single carrier and multi-carrier UL transmission in wireless communication, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UE. A UE can also be called a system, a subscriber unit, a subscriber station, mobile station, mobile, mobile communication device, mobile device, remote station, remote terminal, access terminal (AT), user agent (UA), a user device, or user terminal (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of wireless communication involving a third generation partnership project long term evolution advanced (a 3GPP LTE-A) wireless system, comprising:
   configuring, by a base station, physical uplink control channel (PUCCH) resources of a wireless subframe for transmission of control information;
   scheduling, by the base station, physical uplink shared channel (PUSCH) resources of the wireless subframe for transmission of data information;
   scheduling, by the base station, a first subset of a population of mobile devices to transmit data information on PUSCH resources for a wireless subframe, wherein the first subset also concurrently transmits control information on the PUCCH resources for the wireless subframe;
   scheduling, by the base station, a second subset of the population of mobile devices to transmit data information only on the PUSCH resources for the wireless subframe, wherein the second subset also transmits control information on the PUSCH resources for the wireless subframe;
   establishing a priority for a subset of multi-carrier traffic transmitted by a mobile device, wherein the priority establishes a target transmit power for a control portion of the multi-carrier traffic if the mobile device is constrained to a maximum transmit power, and further wherein the priority implies that data traffic is to be transmitted at a power that does not exceed a difference of the maximum transmit power and the target transmit power; and
   identifying an UL transmit power constraint pertaining to the first subset of the population of mobile devices, wherein the UL transmit power constraint comprises a data transmit power value and a control transmit power value different from said data transmit power value.

2. The method of claim 1, further comprising assigning, by the base station, the PUSCH resources and the PUCCH resources to separate and contiguous uplink (UL) frequency resources for the first subset of the population of mobile devices.

3. The method of claim 1, further comprising assigning, by the base station, a single contiguous block of UL frequency resources within a common UL signal timeframe for transmission of either data information or of control information to meet a single-carrier constraint for the second subset of the population of mobile devices.

4. The method of claim 1, further comprising assigning, by the base station, a single contiguous block of UL frequency resources within a common UL signal timeframe for transmission of both data information and control information to meet a single-carrier constraint for the second subset of the population of mobile devices.

5. The method of claim 1, further comprising prioritizing, by the base station, a power setting for the control information on the PUCCH resources over a power setting for the data information on the PUSCH resources.

6. The method of claim 1, further comprising giving, by the base station, transmit power priority to the control information to satisfy the UL transmit power constraint.

7. The method of claim 1, further comprising giving, by the base station, transmit power priority to the data information to satisfy the UL transmit power constraint.

8. The method of claim 5, wherein the prioritizing the power setting applies to transmission of the control information and the data information in a single subframe of the LTE-A wireless system.

9. The method of claim 5, wherein prioritizing the power setting further comprises specifying a baseline transmit power and an offset transmit power for the control information.

10. The method of claim 5, wherein prioritizing the power setting further comprises specifying a baseline transmit power and an offset transmit power for the data information.

11. An apparatus configured for frequency division multiple access uplink wireless communication (FDMA UL wireless communication), comprising:
    a communication interface for sending and receiving wireless signals within a geographic coverage area;
    memory for storing instructions configured to provide selective single-carrier and multi-carrier transmission for the FDMA UL wireless communication; and
    a data processor for executing modules that implement the instructions, the modules comprising:
      a parsing module that identifies a first subset of mobile devices served by the apparatus that are limited to single carrier UL transmission and a second subset of the mobile devices configured at least for multi-carrier UL transmission;
      a scheduling module that assigns UL resources for the set of mobile devices based on single carrier and multi-carrier transmit capabilities of the first subset of the mobile devices and the second subset of the mobile devices, respectively;
      a power assignment module that specifies an UL transmit power for an UL transmission of a mobile device of the second subset of the mobile devices; and
      a precedence module that establishes a priority for a subset of multi-carrier traffic transmitted by the mobile device, wherein the priority establishes a target transmit power for a control portion of the multi-carrier traffic if the mobile device is constrained to a maximum transmit power, and further wherein the priority implies that data traffic is to be transmitted at a power that does not exceed a difference of the maximum transmit power and the target transmit power, wherein the power assignment module specifies a first UL transmit power value if the UL transmission is sent in a single-carrier fashion and a second UL transmit power value if the UL transmission is sent in a multi-carrier fashion, wherein the second UL transmit power value comprises a data transmit power value and a control transmit power value different from said data transmit power value.

12. The apparatus of claim 11, wherein the data transmit power value is applied to a data portion of the UL transmission and the control transmit power value is applied to a control portion of the UL transmission, and further wherein the data transmit power value is different from the control transmit power value and the data portion and the control portion are transmitted concurrently.

13. The apparatus of claim 11, wherein the subset of multi-carrier traffic comprises a control portion or a data portion of multi-carrier traffic.

14. The apparatus of claim 11, wherein the priority comprises a target transmit power or a transmit power ratio of control and data portions of multi-carrier traffic.

15. The apparatus of claim 11, wherein:
the parsing module obtains UL transmit capabilities of the first subset of the mobile devices and UL transmit capabilities of the second subset of the mobile devices; and
the scheduling module generates an UL resource schedule for the set of mobile devices based on respective UL transmit capabilities that constrains the first subset of the mobile devices to single-carrier UL transmission and that facilitates single-carrier or multi-carrier UL transmission for the second subset of the mobile devices.

16. The apparatus of claim 13, wherein the priority implies that the control portion and the data portion are to be transmitted as separate single-carrier UL transmissions instead of concurrently as a multi-carrier transmission, and that the control portion is to be transmitted before the data portion.

17. An apparatus configured for wireless communication involving a frequency division multiple access uplink, comprising:
means for generating an uplink (an UL) transmission schedule for a population of mobile devices, wherein the processor identifies a first subset of mobile devices that are limited to single carrier UL transmission and a second subset of the mobile devices configured at least for multi-carrier UL transmission, assigns UL resources to the first subset of the population of mobile devices based on a single-carrier constraint, and further wherein the processor assigns UL resources to the second subset of the population of mobile devices without the single-carrier constraint;
means for transmitting the UL transmission schedule on a downlink to the population of mobile devices;
means for specifying an UL transmit power for an UL transmission of a mobile device of the second subset of the population of the mobile devices; and
means for establishing a priority for a subset of multi-carrier traffic transmitted by the mobile device, wherein the priority establishes a target transmit power for a control portion of the multi-carrier traffic if the mobile device is constrained to a maximum transmit power, and further wherein the priority implies that data traffic is to be transmitted at a power that does not exceed a difference of the maximum transmit power and the target transmit power, wherein the means for specifying the UL transmit power specifies a first UL transmit power value if the UL transmission is sent in a single-carrier fashion and a second UL transmit power value if the UL transmission is sent in a multi-carrier fashion, wherein the second UL transmit power value comprises a data transmit power value and a control transmit power value different from said data transmit power value.

18. At least one processor connected to a base station and configured for wireless communication in a frequency division multiple access uplink system, comprising:
a module that generates an uplink (an UL) transmission schedule for a population of mobile devices, wherein the processor identifies a first subset of mobile devices that are limited to single carrier UL transmission and a second subset of the mobile devices configured at least for multi-carrier UL transmission, assigns UL resources to the first subset of the population of mobile devices based on a single-carrier constraint, and further wherein the processor assigns UL resources to the second subset of the population of mobile devices without the single-carrier constraint;
a module that transmits the UL transmission schedule on a downlink to the population of mobile devices;
a module that specifies an UL transmit power for an UL transmission of a mobile device of the second subset of the population of the mobile devices; and
a module that establishes a priority for a subset of multi-carrier traffic transmitted by the mobile device, wherein the priority establishes a target transmit power for a control portion of the multi-carrier traffic if the mobile device is constrained to a maximum transmit power, and further wherein the priority implies that data traffic is to be transmitted at a power that does not exceed a difference of the maximum transmit power and the target transmit power, wherein the module that specifies the UL transmit power specifies a first UL transmit power value if the UL transmission is sent in a single-carrier fashion and a second UL transmit power value if the UL transmission is sent in a multi-carrier fashion, wherein the second UL transmit power value comprises a data transmit power value and a control transmit power value different from said data transmit power value.

19. A computer program product, comprising:
a non-transitory computer-readable medium configured for wireless communication in a frequency division multiple access uplink system, comprising:
code for causing a computer to generate an uplink (an UL) transmission schedule for a population of mobile devices, wherein the processor identifies a first subset of mobile devices that are limited to single carrier UL transmission and a second subset of the mobile devices configured at least for multi-carrier UL transmission, assigns UL resources to the first subset of the population of mobile devices based on a single-carrier constraint, and further wherein the processor assigns UL resources to the second subset of the population of mobile devices without the single-carrier constraint;
code for causing the computer to transmit the UL transmission schedule on a downlink to the population of mobile devices;

code for causing the computer to specify an UL transmit power for an UL transmission of a mobile device of the second subset of the population of the mobile devices; and code for establishing a priority for a subset of multi-carrier traffic transmitted by the mobile device, wherein the priority establishes a target transmit power for a control portion of the multi-carrier traffic if the mobile device is constrained to a maximum transmit power, and further wherein the priority implies that data traffic is to be transmitted at a power that does not exceed a difference of the maximum transmit power and the target transmit power, wherein the code for causing the computer to specify the UL transmit power further causes the computer to specify a first UL transmit power value if the UL transmission is sent in a single-carrier fashion and a second UL transmit power value if the UL transmission is sent in a multi-carrier fashion, wherein the second UL transmit power value comprises a data transmit power value and a control transmit power value different from said data transmit power value.

20. A method of wireless communication employing a frequency division multiple access uplink (a FDMA UL), comprising:
obtaining, by a mobile device, a power schedule for transmission of UL traffic on the FDMA UL;
generating, by the mobile device, a transmission schedule for respective subsets of the UL traffic according to a traffic priority assigned to one subset of the UL traffic that is specified in the power schedule; and
transmitting, by the mobile device, multi-carrier UL traffic according to the transmission schedule, including transmitting respective subsets of the UL traffic concurrently on the FDMA UL in respective PUCCH and PUSCH resources of a common time subframe or time subslot,
wherein generating the transmission schedule for respective subsets of the UL traffic according to the traffic priority further comprises establishing a higher importance for a control portion of the UL traffic than a non-control portion of the UL traffic,
wherein establishing the higher importance for the control portion than the non-control portion of the UL traffic further comprises:
obtaining a target transmit power from the power schedule and applying the target transmit power for transmission of the control portion;
calculating a transmit power remainder from the difference of the target transmit power and a transmit power constraint; and
applying the transmit power remainder to the non-control portion of the UL traffic.

21. The method of claim 20 implemented in a third generation partnership project long term evolution wireless communication system.

22. The method of claim 20, wherein establishing the higher importance for the control portion of the UL traffic than the non-control portion of the UL traffic further comprises transmitting the control portion and a second portion of the UL traffic as separate single-carrier transmissions.

23. The method of claim 20, further comprising employing a full spectrum bandwidth of the FDMA UL for transmitting the UL traffic.

24. The method of claim 22, wherein a single-carrier transmission comprising the control portion is transmitted prior to a single-carrier transmission comprising the second portion.

25. The method of claim 23, wherein the UL traffic comprises control traffic and data traffic transmitted in a single subframe of the FDMA UL.

26. An apparatus configured for wireless communication with a third generation partnership project long term evolution wireless network (an LTE network), comprising:
a communication interface that employs a wireless transceiver for sending wireless information to the LTE network on an uplink and receiving wireless information from the LTE network on a downlink;
memory for storing instructions related to facilitating multi-carrier uplink transmission with the LTE network; and
a data processor for executing modules that implement the multi-carrier uplink transmission, the modules comprising:
an arbitration module that selects between single carrier and multi-carrier uplink transmission for the apparatus;
a scheduling module that identifies a set of control information and a set of data information for uplink transmission by the wireless transceiver, and that assigns the set of control information and the set of data information to either one subframe for concurrent transmission in respective PUCCH and PUSCH resources thereof, or to multiple subframes, depending on a selection made by the arbitration module;
a precedence module that establishes a priority for a subset of multi-carrier traffic transmitted by a mobile device, wherein the priority establishes a target transmit power for a control portion of the multi-carrier traffic if the mobile device is constrained to a maximum transmit power, and further wherein the priority implies that data traffic is to be transmitted at a power that does not exceed a difference of the maximum transmit power and the target transmit power; and
a power module that assigns respective uplink transmit powers to the set of control information and the set of data information, including a control transmit power value and a data transmit power value different from said control transmit power value.

27. The apparatus of claim 26, further comprising a first power control loop that establishes a control transmit power for the set of control information and a second power control loop that establishes a data transmit power for the set of data information.

28. The apparatus of claim 26, wherein the power module determines respective values of the respective uplink transmit powers from a power constraint and a relative priority provided by the LTE network.

29. The apparatus of claim 26, wherein the scheduling module assigns the set of control information and the set of data information to an entire spectrum bandwidth of an uplink subframe or subslot that is allocated to control and data traffic.

30. The apparatus of claim 26, wherein the arbitration module selects between single carrier and multi-carrier based at least in part on a command from the LTE network.

31. The apparatus of claim 26, wherein the arbitration module selects between single carrier and multi-carrier based at least in part on a transmit power constraint established by the LTE network.

32. The apparatus of claim 27, wherein the first power control loop and the second power control loop employ an open loop component for power loss estimates, and employ respective closed loop components to generate respective base transmit powers.

33. The apparatus of claim 31, wherein the arbitration module selects single carrier if the transmit power constraint disallows a target control transmit power or a minimum data transmit power, and further wherein the scheduling module gives transmission priority to the set of control information over the set of data information.

34. An apparatus configured for wireless communication with a third generation partnership project long term evolution wireless network (an LTE network), comprising: a communication interface that employs a wireless transceiver for sending wireless information to the LTE network on an uplink and receiving wireless information from the LTE network on a downlink;
  memory for storing instructions related to facilitating multi-carrier uplink transmission with the LTE network; and
  a data processor for executing modules that implement the multi-carrier uplink transmission, the modules comprising:
    an arbitration module that selects between single carrier and multi-carrier uplink transmission for the apparatus;
    a scheduling module that identifies a set of control information and a set of data information for uplink transmission by the wireless transceiver, and that assigns the set of control information and the set of data information to either one subframe for concurrent transmission in respective PUCCH and PUSCH resources thereof, or to multiple subframes, depending on a selection made by the arbitration module;
    a power module that assigns respective uplink transmit powers to the set of control information and the set of data information;
    a first power control loop that establishes a control transmit power for the set of control information and a second power control loop that establishes a data transmit power for the set of data information; wherein the first power control loop and the second power control loop employ an open loop component for power loss estimates, and employ respective closed loop components to generate respective base transmit powers; wherein the open loop component estimates a receive power loss at the wireless transceiver and generates an uplink power offset to compensate for power loss between the apparatus and the LTE network;
    wherein the power module decodes a base data transmit power and a base control transmit power from respective data and control power commands obtained from the LTE network; and
    wherein the first power control loop combines the uplink power offset with the base control transmit power generated by a first closed loop component to derive the control transmit power, and the second power control loop combines the uplink power offset and the base data transmit power generated by a second closed loop component to derive the data transmit power.

35. An apparatus configured for wireless communication with a third generation partnership project long term evolution wireless network (an LTE network), comprising:
  a communication interface that employs a wireless transceiver for sending wireless information to the LTE network on an uplink and receiving wireless information from the LTE network on a downlink;
  memory for storing instructions related to facilitating multi-carrier uplink transmission with the LTE network; and
  a data processor for executing modules that implement the multi-carrier uplink transmission, the modules comprising:
    an arbitration module that selects between single carrier and multi-carrier uplink transmission for the apparatus;
    a scheduling module that identifies a set of control information and a set of data information for uplink transmission by the wireless transceiver, and that assigns the set of control information and the set of data information to either one subframe for concurrent transmission in respective PUCCH and PUSCH resources thereof, or to multiple subframes, depending on a selection made by the arbitration module; and
    a power module that assigns respective uplink transmit powers to the set of control information and the set of data information;
  wherein the power module:
    determines respective values of the respective uplink transmit powers from a power constraint and a relative priority provided by the LTE network;
    establishes the set of control information or the set of data information as a priority transmission based on the relative priority;
    identifies a minimum transmit power specified for the priority transmission;
    assigns the minimum transmit power to the priority transmission, and assigns a difference of the minimum transmit power and the power constraint to a non-priority transmission.

36. An apparatus for wireless communication that employs a frequency division multiple access (FDMA) uplink, comprising:
  means for obtaining an uplink power constraint from a wireless network;
  means for selecting between single carrier and multi-carrier uplink transmission based at least in part on the uplink power constraint;
  means for identifying a set of control information and a set of data information for uplink transmission by the apparatus and to assign the set of control information and the set of data information to either respective PUCCH and PUSCH resources of one subframe for concurrent transmission in response to a multi-carrier selection, or to multiple subframes in response to a single carrier selection;
  means for establishing a priority for a subset of multi-carrier traffic transmitted by a mobile device, wherein the priority establishes a target transmit power for a control portion of the multi-carrier traffic if the mobile device is constrained to a maximum transmit power, and further wherein the priority implies that data traffic is to be transmitted at a power that does not exceed a difference of the maximum transmit power and the target transmit power; and
  means for assigning respective uplink transmit powers to the set of control information and the set of data information, including a control transmit power value and a data transmit power value different from said control transmit power value.

37. At least one processor connected to a mobile device and configured for wireless communication utilizing a frequency division multiple access (FDMA) uplink, comprising:

a module that obtains an uplink power constraint from an FDMA network;

a module that selects between single carrier and multi-carrier uplink transmission based at least in part on the uplink power constraint;

a module that identifies a set of control information and a set of data information for uplink transmission and that assigns the set of control information and the set of data information to either respective PUCCH and PUSCH resources of one subframe for concurrent transmission in response to a multi-carrier selection, or to multiple subframes in response to a single carrier selection;

a module that establishes a priority for a subset of multi-carrier traffic transmitted by a mobile device, wherein the priority establishes a target transmit power for a control portion of the multi-carrier traffic if the mobile device is constrained to a maximum transmit power, and further wherein the priority implies that data traffic is to be transmitted at a power that does not exceed a difference of the maximum transmit power and the target transmit power; and a module that assigns respective uplink transmit powers to the set of control information and the set of data information, including a control transmit power value and a data transmit power value different from said control transmit power value.

38. A computer program product, comprising:

a non-transitory computer-readable medium configured for wireless communication in a frequency division multiple access (FDMA) uplink wireless system, comprising:

code for causing a computer to obtain an uplink power constraint from an FDMA network;

code for causing the computer to select between single carrier and multi-carrier uplink transmission based at least in part on the uplink power constraint;

code for causing the computer to identify a set of control information and a set of data information for uplink transmission and to assign the set of control information and the set of data information to either respective PUCCH and PUSCH resources of one subframe for concurrent transmission in response to a multi-carrier selection, or to multiple subframes in response to a single carrier selection;

code for causing the computer to establish a priority for a subset of multi-carrier traffic transmitted by a mobile device, wherein the priority establishes a target transmit power for a control portion of the multi-carrier traffic if the mobile device is constrained to a maximum transmit power, and further wherein the priority implies that data traffic is to be transmitted at a power that does not exceed a difference of the maximum transmit power and the target transmit power; and code for causing the computer to assign respective uplink transmit powers to the set of control information and the set of data information, including a control transmit power value and a data transmit power value different from said control transmit power value.

\* \* \* \* \*